US009968955B2

(12) United States Patent
Blackburn

(10) Patent No.: US 9,968,955 B2
(45) Date of Patent: May 15, 2018

(54) MODULAR ROBOTIC ASSEMBLY

(71) Applicant: Robotic Pipe Repair, LLC, Longmont, CO (US)

(72) Inventor: Forrest Blackburn, Loveland, CO (US)

(73) Assignee: Robotic Pipe Repair, LLC, Longmont, CO (US)

( * ) Notice: Subject to any disclaimer, the term of this patent is extended or adjusted under 35 U.S.C. 154(b) by 0 days. days.

(21) Appl. No.: 14/805,111

(22) Filed: Jul. 21, 2015

(65) Prior Publication Data

US 2016/0018045 A1 Jan. 21, 2016

Related U.S. Application Data

(60) Provisional application No. 62/027,155, filed on Jul. 21, 2014.

(51) Int. Cl.
*B05B 3/00* (2006.01)
*B05B 13/06* (2006.01)
(Continued)

(52) U.S. Cl.
CPC .............. *B05B 15/08* (2013.01); *B08B 9/045* (2013.01); *B08B 9/0492* (2013.01); *B25J 5/005* (2013.01);
(Continued)

(58) Field of Classification Search
USPC ................. 118/323, 321, 306, 317; 239/722; 475/332, 341; 901/28, 43
See application file for complete search history.

(56) References Cited

U.S. PATENT DOCUMENTS 4,337,723 A * 7/1982 Davis .................. B05B 13/0636
118/306
4,780,047 A * 10/1988 Holt .......................... B25J 3/04
414/730
(Continued)

FOREIGN PATENT DOCUMENTS

EP 2503208 9/2012
KR 10/083448 6/2008
(Continued)

OTHER PUBLICATIONS

International Search Report and Written Opinion regarding PCT/US2015/041380, dated Oct. 19, 2015.

*Primary Examiner* — Yewebdar T Tadesse
(74) *Attorney, Agent, or Firm* — Polsinelli PC

(57) ABSTRACT

A modular robotic assembly including a first and second pod assembly. The first pod assembly including a first frame assembly extending a first length along a first longitudinal axis, a displacement assembly housed at least partially within the first frame assembly, and a shaft rotatably supported by the displacement assembly at a first end region of the shaft. The shaft extending out of the first frame assembly and coupled with a tooling attachment at a second end region of the shaft. The second pod assembly operably coupled with the first pod assembly such that the first and second pod assemblies operate as a functional unit to perform a task within a conduit. The second pod assembly including a second frame assembly extending a second length along a second longitudinal axis, and a drive mechanism configured to provide movement for the functional unit.

22 Claims, 15 Drawing Sheets

(51) Int. Cl.
*B05B 15/08* (2006.01)
*B25J 5/00* (2006.01)
*B25J 9/08* (2006.01)
*E03F 7/12* (2006.01)
*F16L 55/44* (2006.01)
*B08B 9/045* (2006.01)
*B08B 9/049* (2006.01)
*F16L 101/16* (2006.01)
*F16L 101/30* (2006.01)
*B05B 15/06* (2006.01)
*E03F 3/06* (2006.01)

(52) U.S. Cl.
CPC *B25J 9/08* (2013.01); *E03F 7/12* (2013.01); *F16L 55/44* (2013.01); *B05B 13/0636* (2013.01); *B05B 15/066* (2013.01); *E03F 2003/065* (2013.01); *F16L 2101/16* (2013.01); *F16L 2101/30* (2013.01); *Y10S 901/28* (2013.01); *Y10S 901/41* (2013.01); *Y10S 901/43* (2013.01)

(56) References Cited

U.S. PATENT DOCUMENTS

| | | | |
|---|---|---|---|
| 5,113,885 A | 5/1992 | Ramsey | |
| 5,913,977 A * | 6/1999 | Nichols | F16L 55/46 118/254 |
| 6,917,176 B2 * | 7/2005 | Schempf | G01M 3/005 318/568.11 |
| 2003/0208303 A1 * | 11/2003 | Okamoto | B25J 9/06 700/245 |
| 2008/0109115 A1 * | 5/2008 | Lim | B62D 57/032 700/258 |
| 2012/0197440 A1 | 8/2012 | Frakavec et al. | |
| 2014/0123800 A1 | 5/2014 | Choi | |

FOREIGN PATENT DOCUMENTS

WO  WO2002/070943  9/2002
WO  WO2012/112835  8/2012

* cited by examiner

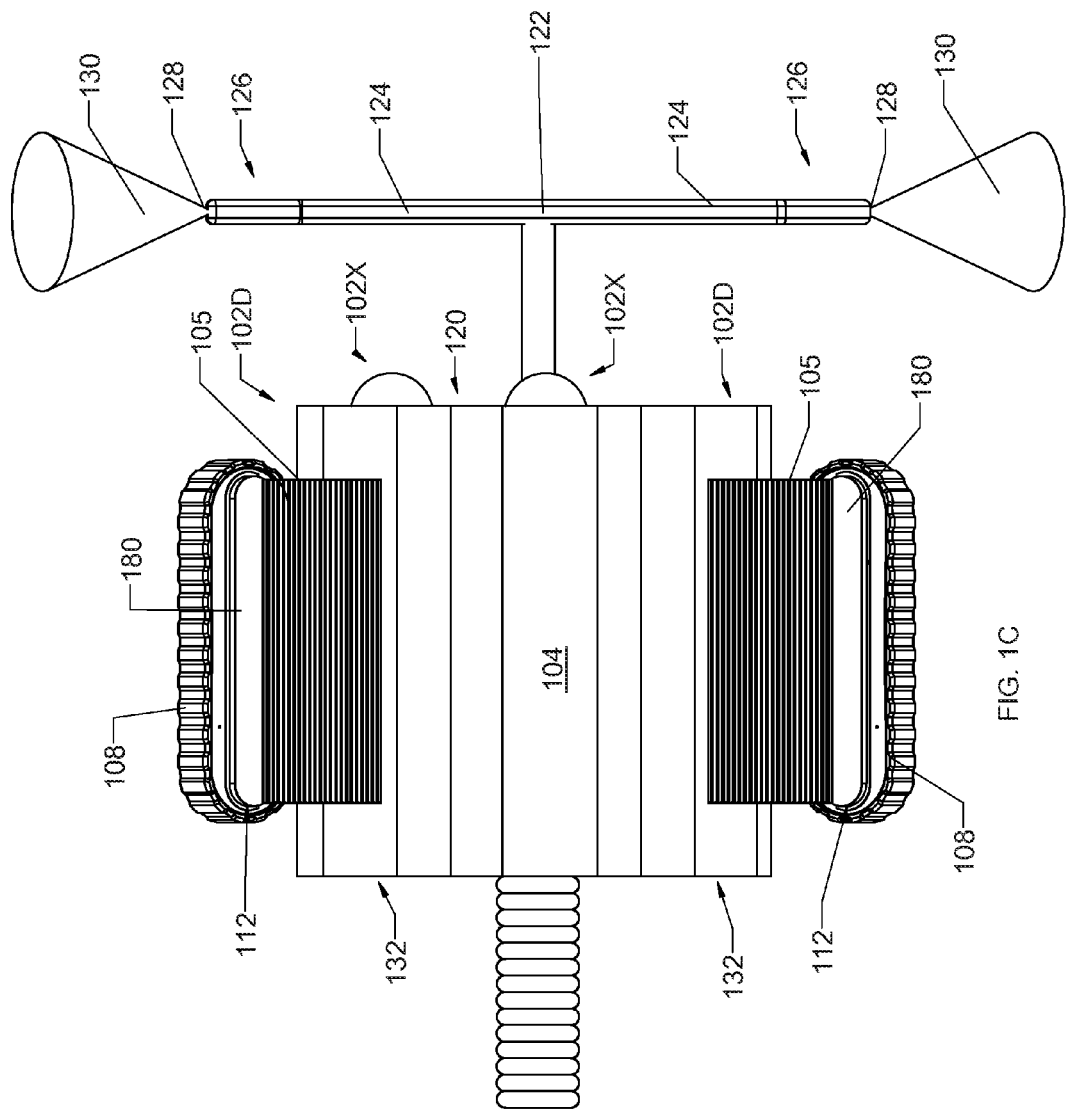

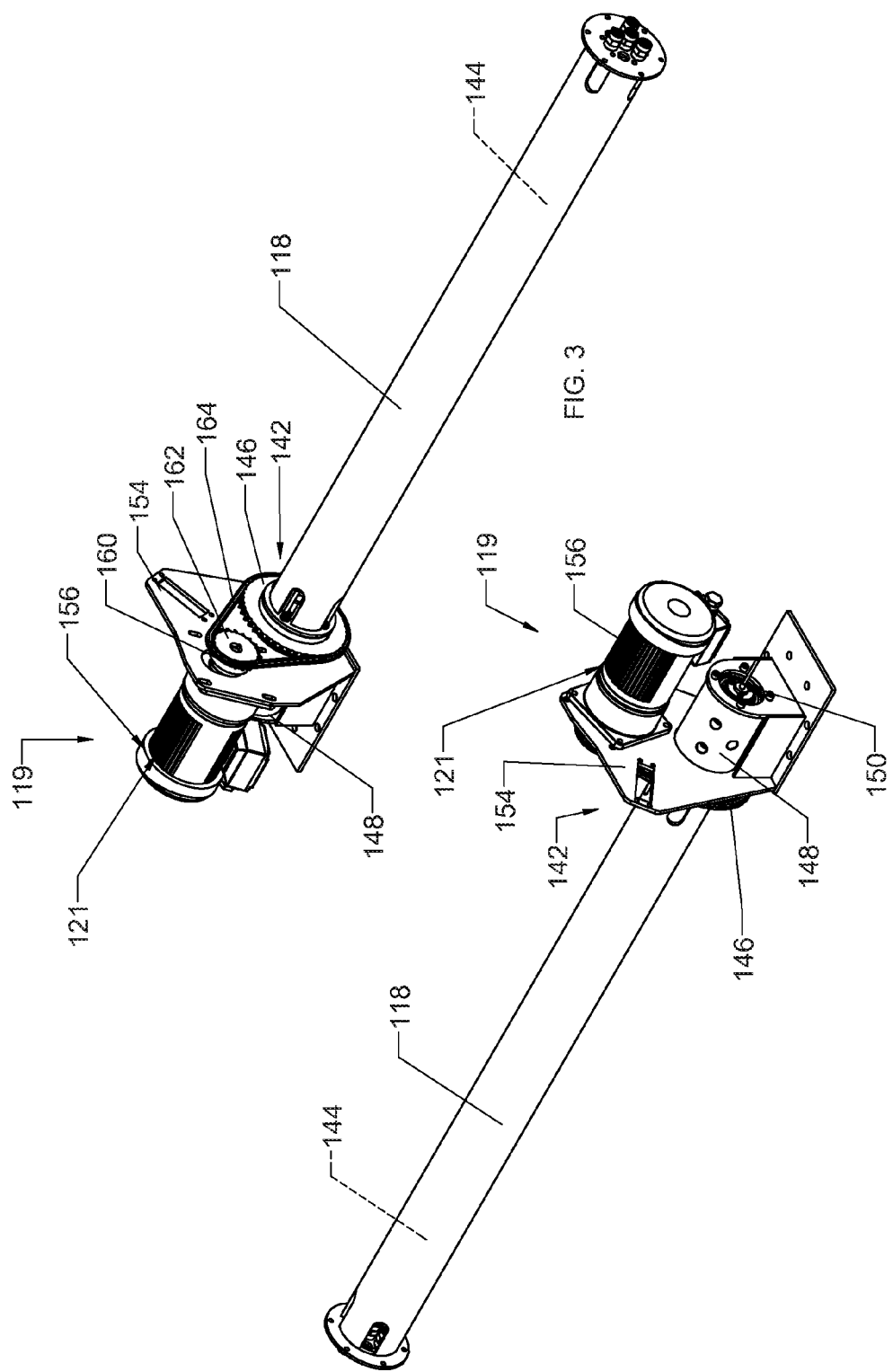

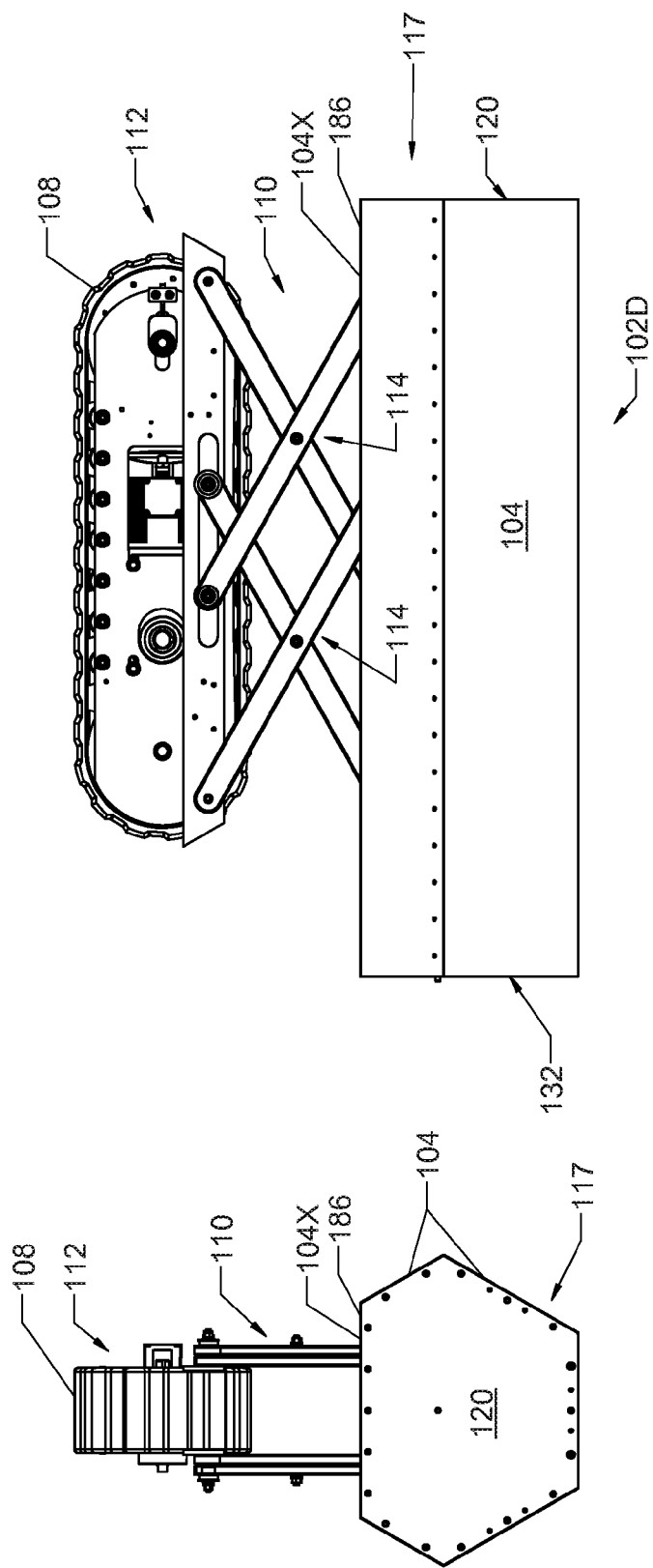

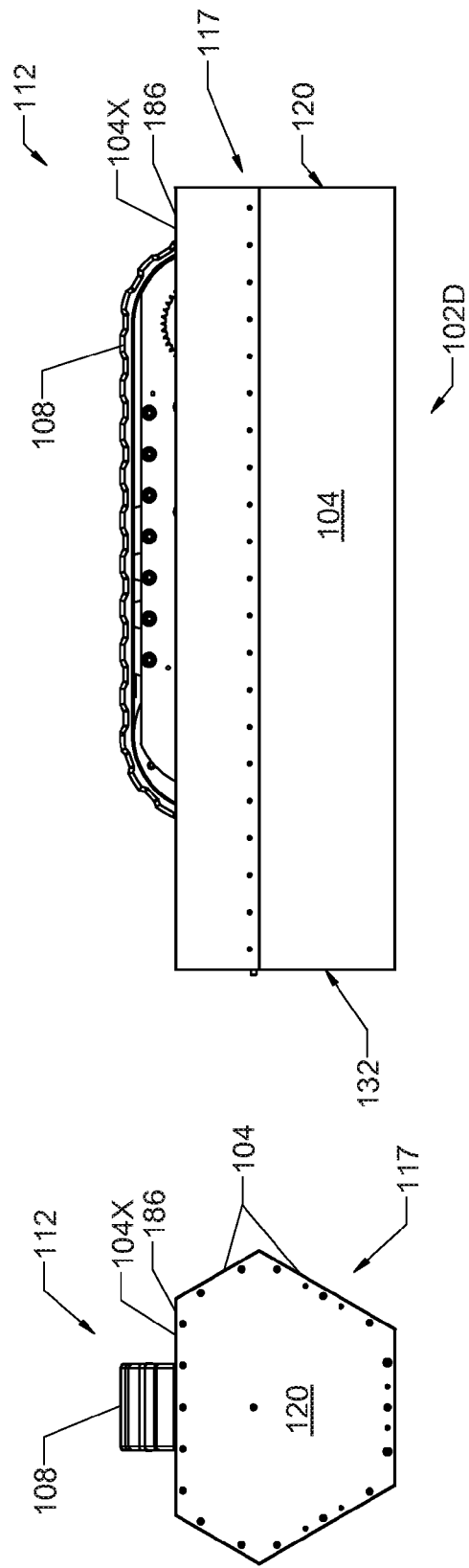

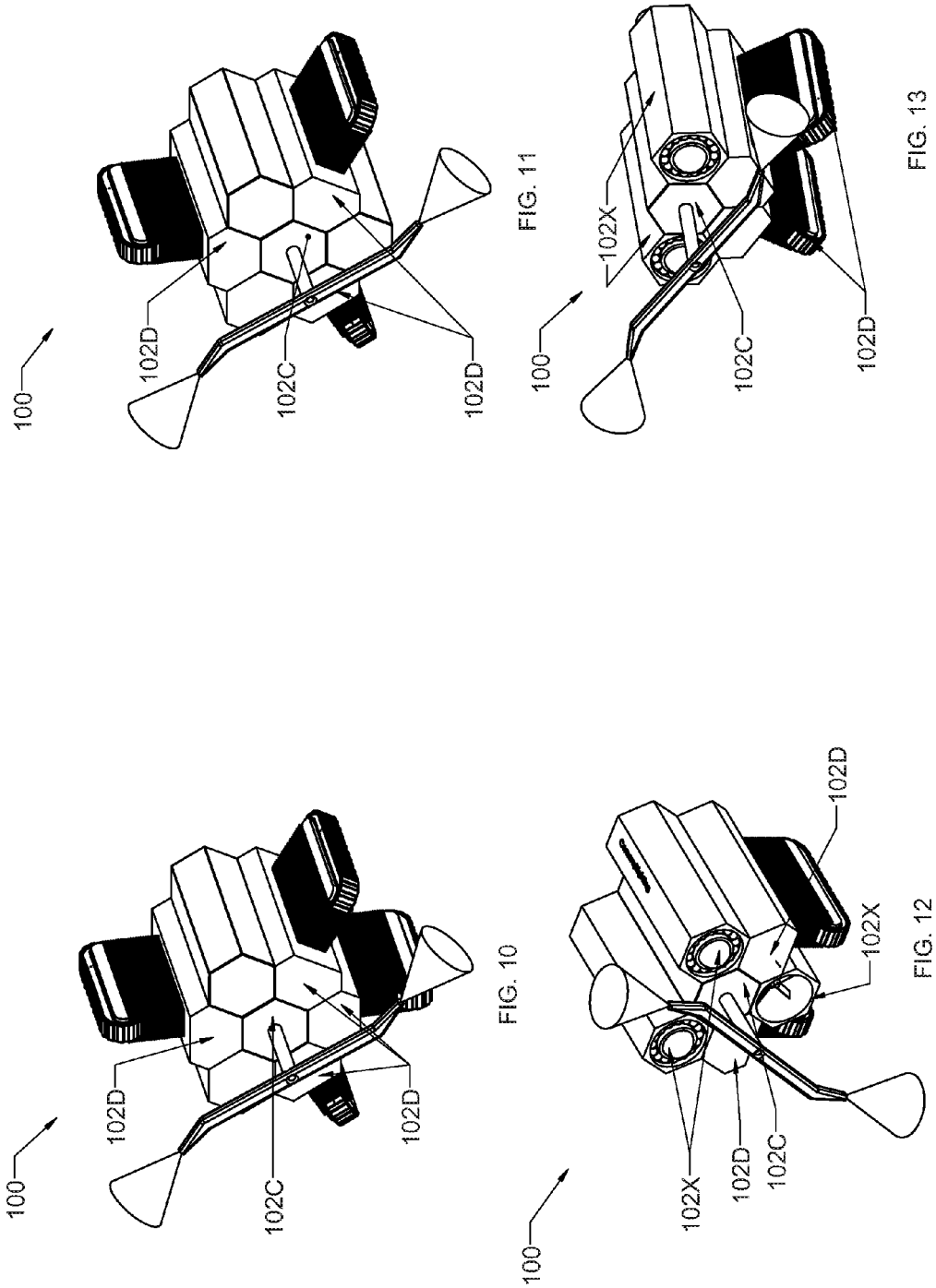

MODULAR ROBOTIC ASSEMBLY

CROSS-REFERENCE TO RELATED APPLICATION

The present application claims priority under 35 U.S.C. § 119 to U.S. Provisional Patent Application No. 62/027,155, filed on Jul. 21, 2014, titled "MODULAR ROBOTIC ASSEMBLY", which is hereby incorporated by reference in its entirety into the present application.

TECHNICAL FIELD

Aspects of the present disclosure involve a modular robotic assembly and, in particular, involve a modular robotic assembly for trenchless repair work within pipes or other conduits of various sizes and geometries.

BACKGROUND

Industries across a wide spectrum utilize large diameter pipes (e.g., 32 inch to 240 inch) in their daily operations. For example, municipalities may utilize large diameter pipes for storm drainage and water management, generally. The oil and gas industry, as well as the utility and power generation industry, utilize such pipes for the transportation of oil and gas. While the uses for large diameter pipes are numerous and varied, all industries using large diameter pipes face the same challenges: finite pipe lifetimes, high repair costs, major service interruptions, major infrastructure impact, personnel safety, and repair efficiency and effectiveness.

As an example of the high costs facing municipalities, the Environmental Protection Agency estimates that the current repair and upgrade cost of municipal water systems across the country is estimated in the hundreds of billions of dollars. The majority of large diameter pipes in this market include pre-cast concrete pipes and steel pipes that are outdated and in need of immediate repair. As an example from the oil and gas industry, there are over 250 pipeline companies in the United States that operate hundreds of thousands of miles of oil pipelines and millions of miles of gas pipelines. Service interruptions on this scale are massive and, due to the length of the pipelines, such interruptions involve a widespread impact on direct and indirect industries.

Conventional repair methods of large diameter pipe include digging up broken or damaged sections of pipe and replacing each section, or installing a smaller diameter pipe within the large diameter pipe (i.e., sliplining). While these methods may fix the immediate problem of a damaged pipe, these methods do not alleviate the overarching challenges mentioned above. Another, rather undesirable, repair method is to utilize manned entry into the pipeline for manual repair and/or maintenance to the internal side of the pipe. This type of repair method leads to a host of problems, including subjecting humans to the noxious conditions inside of these confined spaces.

To alleviate some of the challenges listed above, industries are attempting to "repair before replace" by utilizing remote technologies to reduce or eliminate manned entry into the pipes. There is, however, a need for advancement in remote technologies to meet the varying demands of industries that utilize large diameter pipes.

With these thoughts in mind, among others, aspects of the modular robot assembly disclosed herein were conceived.

SUMMARY

Aspects of the present disclosure involve a modular robotic assembly including a first and second pod assembly. The first pod assembly may include a first frame assembly extending a first length along a first longitudinal axis, a displacement assembly housed at least partially within the first frame assembly, and a shaft rotatably supported by the displacement assembly at a first end region of the shaft. The shaft may extend out of the first frame assembly and be coupled with a tooling attachment at a second end region of the shaft. The displacement assembly may be configured to cause the shaft to translate or rotate relative to the first housing. The second pod assembly operably may be coupled with the first pod assembly such that the first and second pod assemblies operate as a functional unit to perform a task within a conduit. The second pod assembly may include a second frame assembly extending a second length along a second longitudinal axis, and a drive mechanism configured to provide movement for the functional unit.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 1C depicts a side view of the modular robotic assembly of FIG. 1A.

FIG. 3 depicts is a front isometric view of the shaft, mounting plate, and gear motor of the center pod assembly.

FIG. 4 depicts back isometric view of the shaft, mounting plate, and gear motor of the center pod assembly.

FIG. 5B depicts a front view of the drive pod assembly of FIG. 5A.

FIG. 5C depicts a side view of the drive pod assembly of FIG. 5A.

FIG. 5D depicts a front view of the drive pod assembly with the drive assembly in a retracted position.

FIG. 5E depicts a side view of the drive pod assembly with the drive assembly in a retracted position.

FIG. 10 depicts an isometric view of a modular robotic assembly with a single center pod assembly and four drive pod assemblies.

FIG. 11 depicts an isometric view of a modular robotic assembly with a single center pod assembly and three drive pod assemblies.

FIG. 12 depicts an isometric view of a modular robotic assembly with a single center pod assembly and two drive pod assemblies oriented parallel to each other.

FIG. 13 depicts an isometric view of a modular robotic assembly with a single center pod assembly and two drive pod assemblies oriented next to each other.

DETAILED DESCRIPTION

Aspects of the present disclosure involve a modular robotic assembly that is adapted to remotely operate in a pipe environment having any number of sizes and geometric configurations. The modular robotic assembly may be configured to operate in pipes having cross-sections that are, for example: circular, oval, square, curvilinear triangular, hexagonal, etc. The modular robotic assembly may be configured to fit such cross-sectional pipe geometries by configuring individual pod assemblies into a cluster of individual pod assemblies that, once coupled together, fit the particular pipe's geometry and operate as a functional unit to perform a task within the pipe. Each of the individual pod assemblies may have specific functions, such as providing movement within the pipe, performing a pipe repair and/or maintenance (e.g., epoxy spraying), providing storage for repair products (e.g., storing the epoxy for the sprayer) and providing communications (e.g., visual communication via a camera) to an above-ground control unit and operator, among other functions. Thus, when the individual pod assemblies are assembled into a cluster, the cluster is capable of performing the functions of the individual pod assemblies as a collective group. The modular robotic assembly may further be configured into multiple clusters in communication with each other and the clusters may further be in communication with a control unit outside the pipe.

Each cluster of individual pod assemblies may perform a different function from each other or each cluster may similarly function. For example, a first cluster may include individual pod assemblies for movement, lighting and visual communications, and performing a repair operation, such as high pressure water spraying to an internal wall of the pipe. The first cluster may be coupled to a second cluster that provides of onboard electronics and controls for both the first cluster and the second cluster. The second cluster may be in wired communication through wires bundled together with an umbilical cord that extend from the cluster, down a length of the pipe, and out of an opening of the pipe (e.g., manhole) and to a control unit.

Figure 1A:
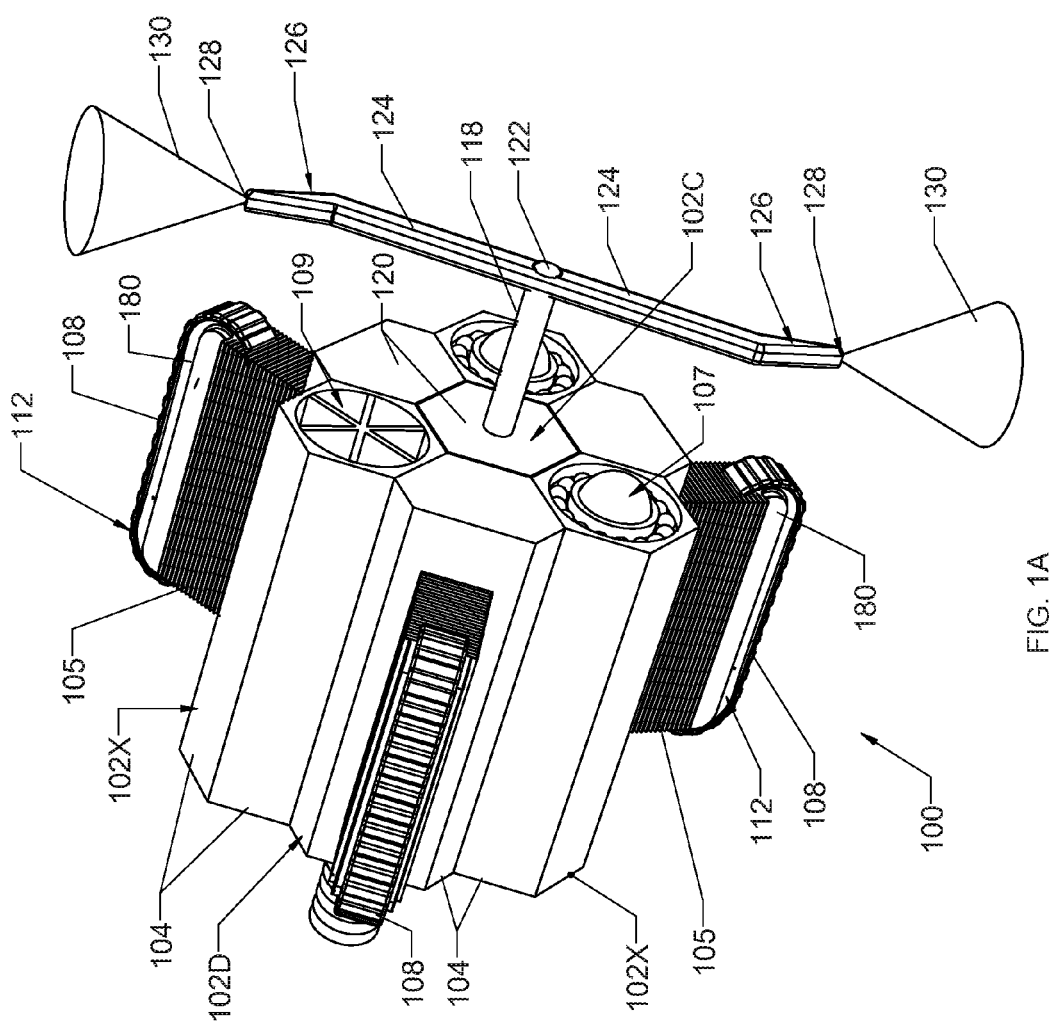
FIG. 1A depicts an isometric view of a modular robotic assembly.
Figure 1B:
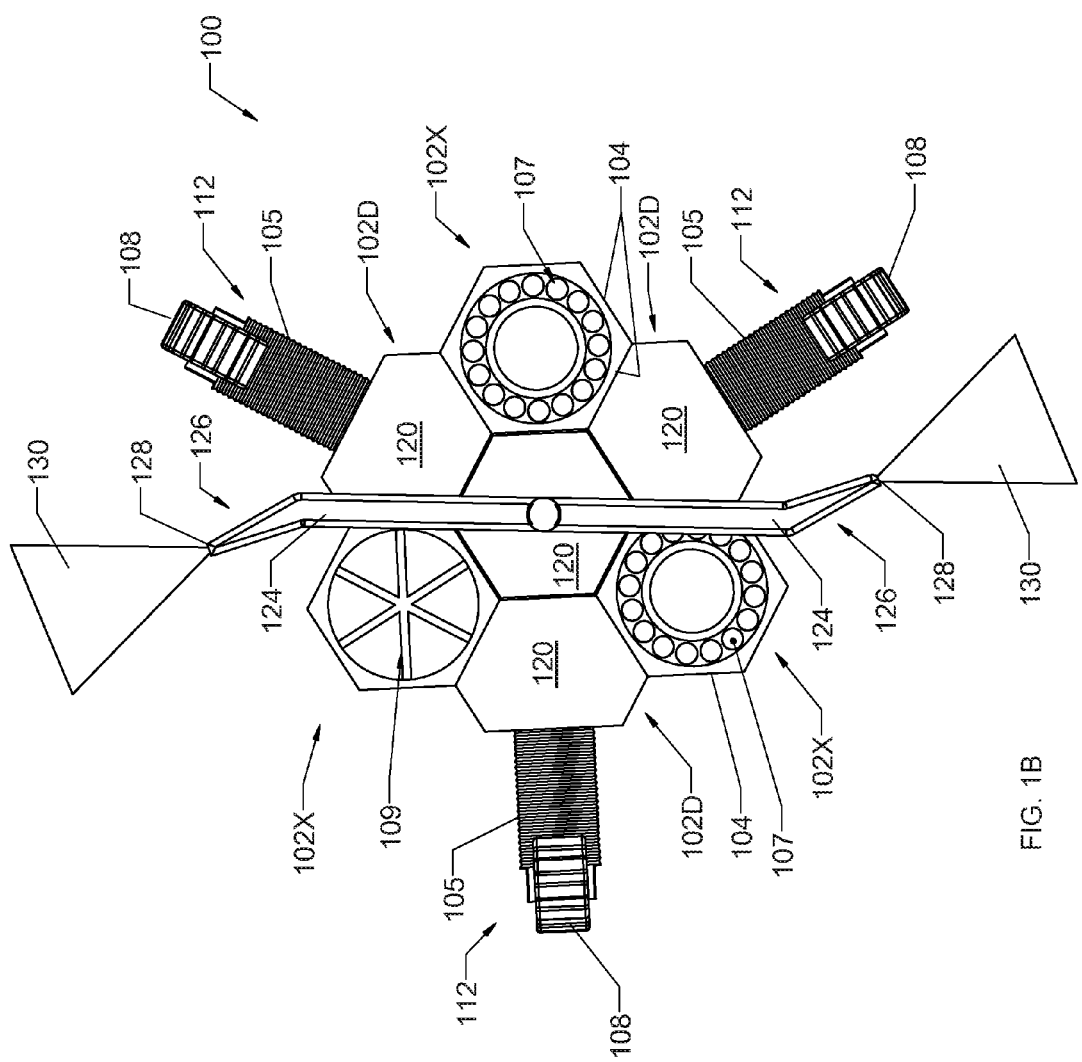
FIG. 1B depicts a front view of the modular robotic assembly of FIG. 1A.

Reference is now made to FIGS. 1A-1C, which are, respectively, a front isometric view, a front view, and a side view of a first embodiment of a modular robotic assembly 100. In the cluster configuration as shown, the modular robotic assembly 100 includes four individual pod assemblies 102. Each pod assembly 102 defines a hexagonal cross-section along a longitudinal axis with six side walls or side wall members 104 that extend between planar ends of the assembly 102. The individual pod assemblies 102 are configured to assemble with each other to form the cluster by aligning respective side walls 104 of each of the individual pod assemblies 102 in a shape that will fit into a particular pipe geometry. In the first embodiment, the modular robotic assembly 100 is arranged in a cluster of individual pod assemblies 102 that is configured to fit into a large diameter pipe having a circular cross-section, for example. The particular arrangement includes a central pod assembly 102C and three outer pod assemblies 102 which are coupled to alternating side walls 104 of the central pod assembly 102C.

The three outer pod assemblies 102 are drive pod assemblies 102D that each support a tracked drive to move the modular robotic assembly 100. While the various pod assemblies are described as defining a hexagonal cross-section, other cross-sectional shapes are possible. For example, the pod assemblies 102 could include a cross-sectional shape that is square or triangular, among other possible cross-sectional shapes.

As seen in FIGS. 1A-1C, the center pod assembly 102C is also coupled along the side walls 104 to three control pod assemblies 102X. Two of the control pod assemblies 102X include cameras and lighting equipment 107, while the other control pod assembly 102X includes a blower 109 (e.g., fan).

As further seen in FIGS. 1A-1C, the drive pod assemblies 102D, in this case, three of the outer pod assemblies, may include a twin-scissor lift assembly 110 (hidden in FIGS. 1A-1C by a bellow 105) that supports a drive assembly or drive mechanism 112 that includes a continuous tread track or tread 108. These features, among others, will be discussed further in reference to FIGS. 5-6.

The drive pod assemblies 102D, as well as the control pod assemblies 102X, may be coupled to the side walls 104 of the central pod assembly 102C in many different orientations in order to fit the particular geometry of the large diameter pipe it will be operating within. For example and as will be discussed later, instead of coupling a side wall 104 of the drive pod assembly 102D that is opposite the drive assembly 112 to the central pod assembly 102C, a different side wall 104 of the drive pod assembly 102D may be coupled to the central pod assembly 102C as required by the particular geometry of the large diameter pipe. For example, as seen in FIG. 13, the modular robotic assembly 100 is configured to operate within a rectangular pipe and the drive pod assemblies 102 are coupled to the central pod 102C in such a way to facilitate the tread of the drive assemblies 112 to contact the inner walls of an upper and lower section of the pipe.

Referring again to FIGS. 1A-1C, the central pod assembly 102C includes functionality specific to a particular repair, maintenance, assembly or other function to be carried out within the particular conduit environment. For example, the first embodiment of the modular robotic assembly 100 includes a center pod assembly 102C that includes a shaft 118 extending distally out of a front wall or front wall member 120. As seen in later figures, the shaft 118 is coupled with a tooling hub 122 that is further coupled to tooling arms 124 that terminate in a spray head 126 that includes a nozzle 128 that may be used to apply a repair product (e.g., epoxy) 130 to an internal side of the pipe. Epoxy may be used to seal cracks in the pipe and otherwise facilitate repair of faults in the integrity of the pipe. The shaft 118 can translate distally away from the front wall 120 of the center pod assembly 102C and, once at an extreme distal end, then translate proximally back towards the front wall 120 of the center pod assembly 102C. In addition to translation, the shaft 118 can also rotate to facilitate applying the repair product to the inner walls of the pipe. When used in conjunction, the translation and rotation aid in applying an even coat of the repair product 130 and avoid oversaturating a single point on the inner wall of the pipe.

The center pod 102C may be coupled with the drive pod assemblies 102D in a number of ways, which can include coupling a plate (not shown) to respective front and back wall members 120, 132 of the center pod and drive pod assemblies 102C, 102D. In this way, the side walls 104 remain clear to add additional pod assemblies 102C, 102D to the cluster.

As evident by the discussion of the first modular robotic configuration in FIGS. 1A-1C, individual pod assemblies 102C, 102D may be arranged in various configurations to operate within various pipe geometries. The additional configurations for operating within other pipe geometries will be discussed in more detail later. Now, the discussion will focus on the individual pod assemblies 102. In particular, the discussion will focus on a few examples of possible pod assemblies 102. Other examples are possible and contemplated by the following discussion. First, the center pod assembly 102C will be described. Second, the drive pod assemblies 102D will be discussed. Third, control pod assemblies 102X will be discussed and, fourth, tooling attachments are addressed. After the assemblies 102 are discussed, the discussion will then focus on the sizing and materials, as well as various configurations of the modular robotic assembly 100 and its operation within a large diameter pipe environment.

I. Center Pod Assembly

Reference is now made to FIGS. 2-4, which are, respectively, a front isometric view of a center pod assembly with three of six side walls 104 removed to show the inner workings of the assembly, a top isometric view of the center pod assembly 102C, a front isometric view of the shaft 118 and rotational components, and a back isometric view of the shaft and rotational components. As discussed previously, the center pod assembly 102C functions to perform a repair task such as high pressure water or abrasive spraying (e.g., up to 40,000 psi) or continuous film coating of epoxies, polyuria, cementious coatings, among other tasks. To facilitate such repair tasks, the center pod assembly 102C includes a frame assembly 117 that includes six side wall members 104 that are coupled to a front wall member 120 and a back wall member 132. A longitudinal axis may be defined that extends through the front and back wall members 120, 132 along a length of the pod assembly 102C. The side wall members 104 and the front and back wall members 120, 132 are supported by internal hexagonal braces 134 and side spanning members 136. The internal hexagonal braces 134 match an outer perimeter of the front and back wall members 120, 132 and are configured such that the front and back wall members 120, 132 may be secured to the two outer most internal hexagonal braces 134. The sidewall members 104, also, may be secured to the internal hexagonal braces 134. The side spanning members 136 extend from the two outer most internal hexagonal braces 134 and provide a structure that links all of the internal hexagonal braces 134 when neither the sidewall member 104 nor the front and back wall members 120, 132 are secured to the internal hexagonal braces 134. In the embodiment of FIG. 2, there are six internal hexagonal braces 134 and two side spanning members 136. There may, however, be more or less internal hexagonal braces 134 and side spanning members 136 as required by the particulars of the center pod assembly 102C. Moreover, other frame assemblies and pod shapes (e.g., square, triangular) are possible.

The center pod assembly 102C further includes a shaft 118 that extends from within the center pod assembly 102C out an opening 138 in the front wall member 120. The shaft 118 includes a distal end 140 that attaches to a tooling attachment 122, such as a tooling hub that is coupled to a telescoping tooling arm 124 with a spray head 126, a proximal end 142 opposite the distal end 140, and a lumen 144 extending through the shaft 118 for hoses, wires, or other mechanisms to pass therethrough.

Referring to FIGS. 2-4, a proximal end 142 of the shaft 118 is coupled with a displacement assembly 117 that facilitates translational and rotational movement of the shaft 118. In this way, the shaft 118 may be translated by the displacement assembly 117 such that the shaft 118 extends and/or retracts from the frame assembly 119 relative to the front wall member 120. Additionally, the shaft 118 may be rotated by the displacement assembly 117 to facilitate the repair task (e.g., spraying). In particular, the displacement assembly 117 includes a rotation assembly 121 and a translation assembly 123 to facilitate the respective functions of rotation and translation.

As best seen in FIGS. 3 and 4, which depicts the shaft 118 coupled with the rotation assembly 121, the proximal end 142 of the shaft 118 is coupled to a sprocket 146, which is then coupled with a rotary union 148. The sprocket 146 is rigidly coupled with the shaft 118, while the rotary union 148 provides a stationary union between the rotatable sprocket 146 and shaft 118 and the rest of the assembly that does not rotate. As seen in FIG. 3, the rotary union 148 provides for the transmission of fluids, pneumatics, tubing, and anything else that must communicate through the lumen 144 of the shaft 118 and out to the tooling attachments 122 but cannot rotate within the shaft 118. The rotary union 148 also provides an electrical slip ring 150 at its proximal end that allows for the transmission of power and communication of control signals, as well as feedback signals from the operable componentry attached to the shaft 118.

Reference still to FIGS. 3-4, the rotary union 148 is coupled to a mounting plate 154 that extends perpendicularly to the extension of the shaft 118 and parallel to the sprocket 146. Since the mounting plate 154 is coupled to the rotary union 148, it does not rotate. Above the sprocket 146 and on an opposite side of the mounting plate 154, a gear motor 156 is coupled to the mounting plate 154. A shaft of the gear motor 156 extends through an opening 160 in the mounting plate 154 and is coupled with a small sprocket 162 that is aligned with the sprocket 146 on the shaft 118. The respective sprockets 146, 162 are coupled via a belt or chain 164 such that when the gear motor 156 supplies power to the shaft, power is transferred into the small sprocket 162 and it rotates. Rotation of the small sprocket 162 transfers energy into the belt 164, which in turn transfers energy into the sprocket 146 on the shaft 118. The sprocket 146 then rotates, thus, rotating the shaft 118. While this particular arrangement of a rotation assembly 121 is described to facilitate rotation of the shaft 118, other arrangements are possible and contemplated by this disclosure.

Referring back to FIGS. 2A-2B, the discussion will now focus on the translation assembly 123 within the frame assembly 117 of the center pod assembly 102C. As seen in the figures, the rotary union 148 and, thus, the mounting plate 154, shaft 118, and gear motor 156, are coupled to a carriage 166 that translates distally-proximally within the confines between the front wall member 120 and the back wall member 132 via a linear rail 168. Thus, the carriage 166 facilitates the distal-proximal translational movement of the shaft 118 as it extends out of the center pod assembly 102C to perform a particular repair task. The carriage 166 is a platform with internal ball bearings that form a smooth bearing surface for the carriage and the load on the carriage 116. The carriage 166 translates linearly on the linear rail 168 and translates via a lead screw, belt or chain drive, or similar screw that is positioned within the linear rail 168. The lead screw extends the length of the linear rail 168 and the carriage 166 includes a nut-feature that engages with the lead screw such that as the lead screw rotates the nut-feature, along with the carriage 166, translates according to the rotation of the lead screw. The lead screw is actuated by a translation motor 170 at a proximal end 172 of the linear rail 168. The translation motor 170 in this particular embodiment includes a stack of two right angle motors 174 coupled with a belt that include beveled gears, worm gears, or other mechanisms to drive the lead screw from a perpendicular orientation. Alternatively, an in-line motor (not shown) may be used. And, while the translation assembly 123 described herein includes translation of the carriage 166 via a lead screw, other mechanisms that provide linear movement are possible and contemplated by this disclosure.

As seen in the figures, the displacement assembly 119 functions to displace the shaft 118 in various ways for particular needs of a repair task. In particular, the rotation assembly 121 is translated within the frame assembly 117 via the translation assembly 123. In this way, the rotation assembly 121 may rotate the shaft 118 and the translation assembly 123 may cause the shaft 118 to translate and extend or retract out of the frame assembly 117 to facilitate a particular repair task within a pipe.

Figure 2A:
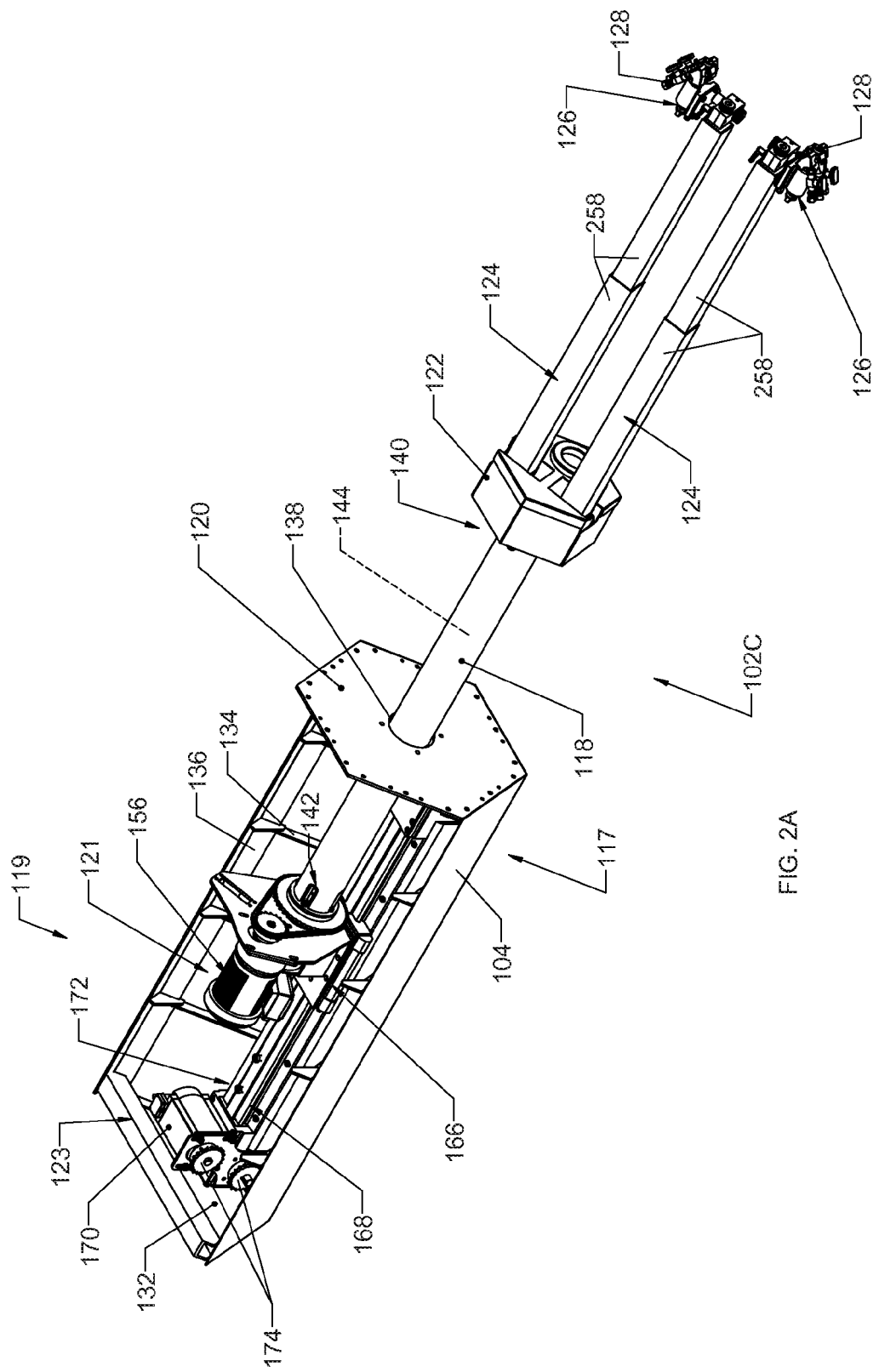
FIG. 2A depicts an isometric view of a center pod assembly with four of six side walls removed to show the inner workings of the center pod assembly.
Figure 2B:
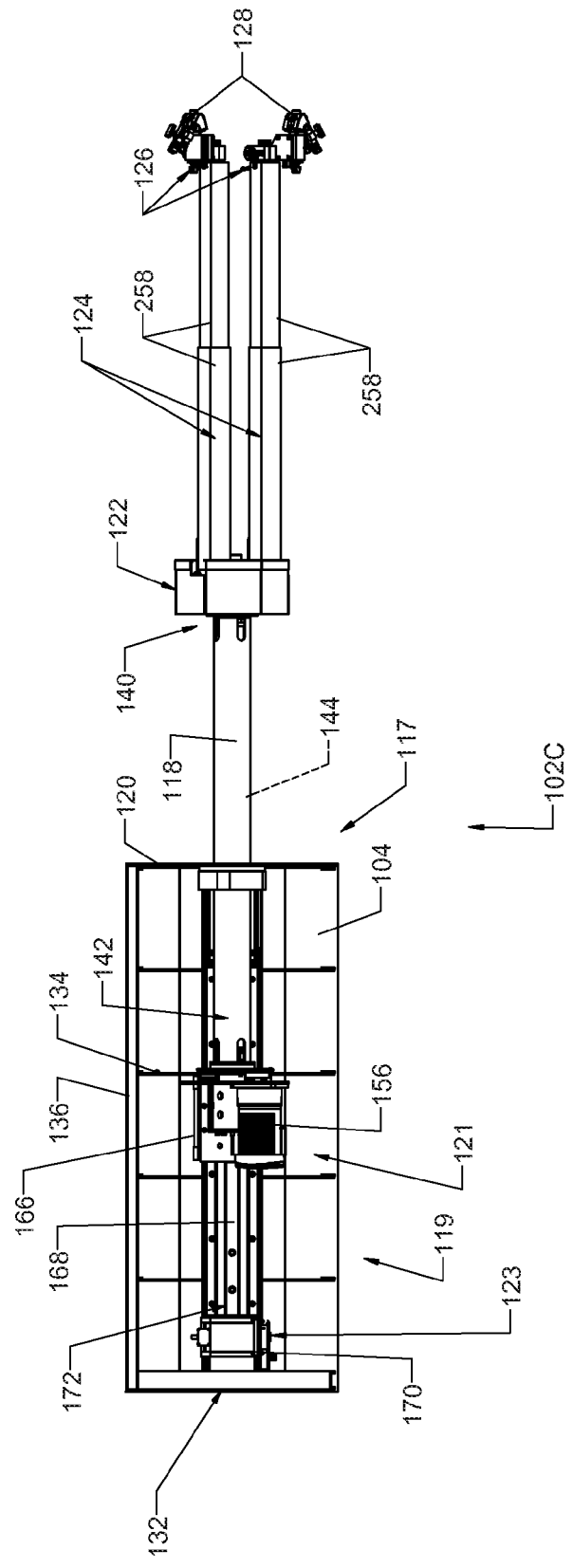
FIG. 2B depicts a top view of the center pod assembly of FIG. 2A.

Referring still to FIGS. 2A-2B, in order to accommodate the translational movement of the rotary motor 156, rotary union 148, and other equipment that may require an electrical connection, a cable carrier (not shown) is coupled to the front side of the mounting plate 154 at one end and to a stationary portion of an internal side of the center pod assembly 102C (e.g., side of the linear rail, side spanning member) at a second end. The cable carrier is a guide designed to house and guide flexible cables and hoses that are coupled to moving pieces of equipment. Once the cables are secured via the cable carrier to the mounting plate 154, the cables may be connected to their respective ports in the rotary motor 156 and rotary union 148 without concern that the cable will snag on any moving parts because the cable carrier confines the cables within the carrier and restricts their movement.

The translation motor 170 of the translation assembly 123 and the gear motor 156 of the rotation assembly 121 may be controlled remotely by an operator that is not in the pipe. The wires associated with communication and power, from the rotary motor 156 and the translation motor 170, along with any electrical wires and/or hoses associated with the tooling attachments, may be routed through an opening (not shown) in the back wall member 132 of the center pod assembly 102C and may be coupled with a proximal cluster of pod assemblies 102 or may be routed along the pipe and out an opening (e.g., manhole) to a control unit. The control unit may include power supplies and various controllers (e.g., programmable logic controller) for the motors and for the modular robotic assembly 100, generally.

Having the modular robotic assembly 100 capable of both translating the shaft 118 proximally-distally and rotating the shaft 118 via the displacement assembly 117 described herein provides for a number of options when performing a repair task. For example, it may be advantageous in certain repair projects, such as applying an epoxy coating to an inner wall of a pipe, to simultaneously rotate and translate the shaft 118 of the center pod assembly 102C. As with other repair tasks, such as high pressure water spraying, it may only be necessary to rotate the shaft 118 during the spraying operation. Accordingly, the functionality of the rotation and the translational aspects of the shaft 118 provide a number of options in designing repair plans for a particular pipe environment.

II. Drive Pod Assembly

Moving on, the discussion will now focus on FIGS. 5-8 and the drive pod assembly 102D. Initially, reference is first made to FIGS. 5A-5C, which are, respectively, an isometric view, a front view, and a side view of the drive pod assembly 102D, with the bellow 105 hidden from view. As stated previously, the drive pod assembly 102D includes a twin-scissor lift assembly 110 and a drive assembly 112.

The twin-scissor lift assembly 110 includes a pair of scissor lifts 114, where each scissor lift 114 is a mechanism to achieve extension by way of linked, folding support members 116 that form a scissoring action by way of a crisscrossing pattern. Extension of the scissor lift 114 is accomplished by application of inward pressure to compress a pair of ends. Each of the twin-scissor lift assemblies 110 is configured to retract inward to house the drive assembly 112 within a housing of the drive pod assembly 102D and is configured to extend outward (as shown in FIG. 1) to expose the drive assembly 112 to contact an inner wall of a pipe, and to adjust so that the robot 100 may fit within a different size pipe. Thus, when each of the drive assemblies 112 extends, the twin-scissor lift assemblies 110 extend equally outward such that the drive assemblies 112 of each drive pod assembly 102 contacts the inner wall of the pipe. When this occurs, the central pod assembly 102C will be positioned within a center portion of the pipe; however, it is possible to extend the scissors independently and in differing amounts depending on the particular demands of the repair task.

The drive assembly 112 includes the tread 108 and a drive assembly cover 180, as seen in FIGS. 1A-1C, that shields its internal componentry from the conditions within the pipe environment. The drive pod assembly 102D includes a truncated hexagonal shaped cross-section along a longitudinal direction of the drive pod assembly 102D. A front and a back wall member 120, 132 are also a truncated hexagonal shape with a single truncated edge 182 on a side of the drive assembly 112. The drive pod assembly 102D further includes side wall members 104 on six sides of the assembly. The assembly 102D may include a longitudinal axis extending between the front and back wall members 120, 132 along a length of the assembly 102D. The side wall member 104X bounded on outer ends by the truncated edges is wider than the other side wall members 104 and includes an opening 184 for the twin-scissors 114 and the drive assembly 112 to extend therethrough. In addition, the two side wall members that are adjacent the side wall member 104X with the opening 184 are narrower than any of the other side wall members 104. While the cross-section of the drive pod assembly 102D defines a truncated hexagon, when the drive assembly 112 is in a fully retracted position (i.e., scissors are fully open) the tread 108 on the drive assembly 112 extends out from a top surface 186 of the side wall member 104X defined by the truncated edges 182 to a plane that would define a regular hexagon. Stated differently, in a fully retracted position, a distance from the tread 108 to an opposite side wall member 104 is equivalent to a distance between any other two opposing side wall members 104. Not shown is a flexible or pleated membrane to protect the scissor mechanism and the drives.

As seen in FIGS. 5B-5C, the scissor lifts 114 are in an extended position such that the drive assemblies 112 are extended out from the housing formed by the side wall members 104 and the front and back wall members 120, 132. In contrast, as seen in FIGS. 5D-5E, the scissor lifts 114 are in a retracted position such that the drive assemblies are housed at least partially within the housing formed by the side wall members 104 and the front and back wall members 120, 132. The drive assemblies 112 may function to provide movement for the modular robotic assembly 100 while retracted or extended, or at any point between being fully retracted or fully extended. The actuation assembly 192, discussed in reference to FIGS. 7 and 8, functions to retract and extend the drive assembly 192 via the scissor lifts 114 a given amount based on the needs of the particular repair project within a pipe environment.

Figure 5A:
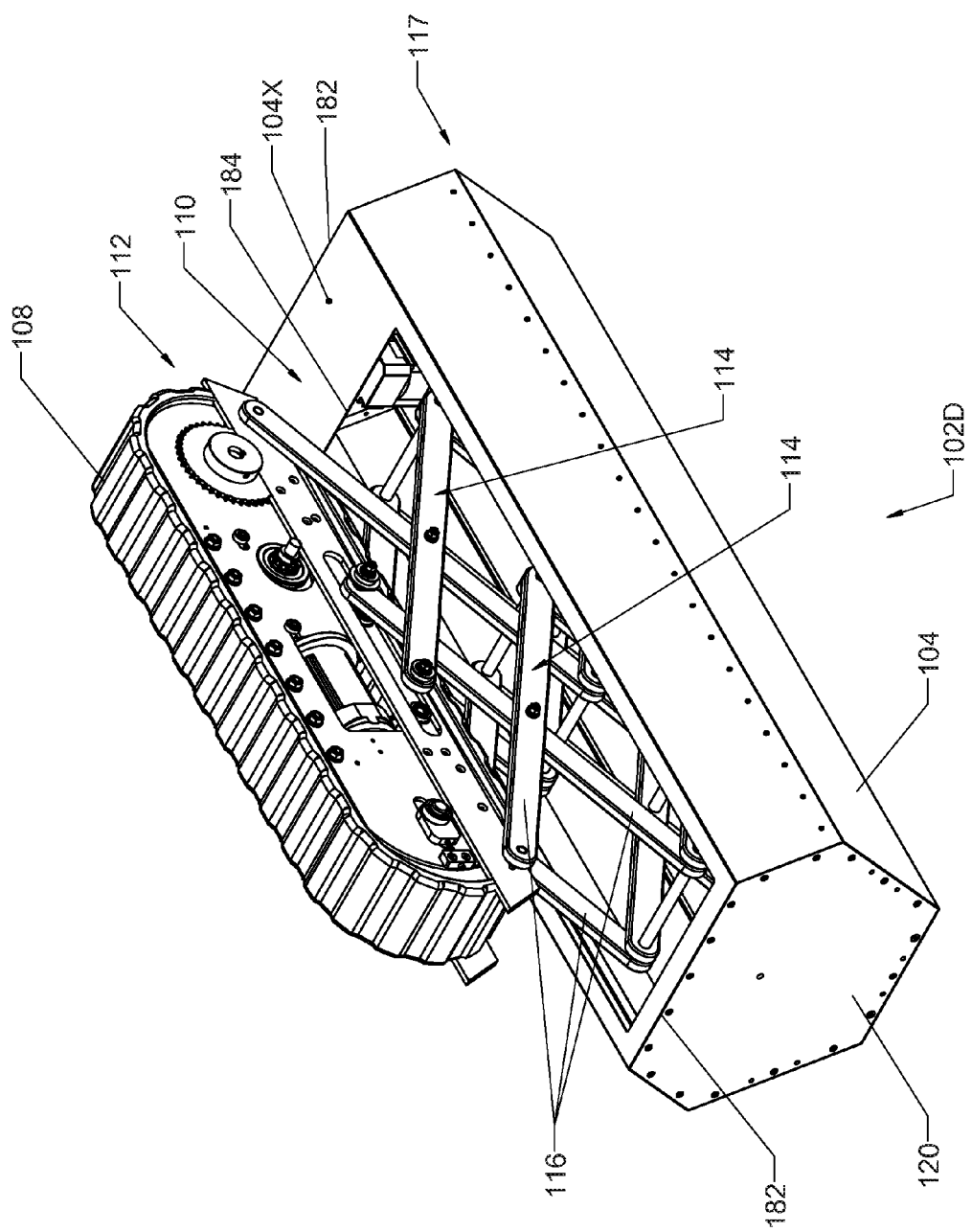
FIG. 5A depicts an isometric view of a drive pod assembly with the drive assembly in an extended position.
Figure 6:
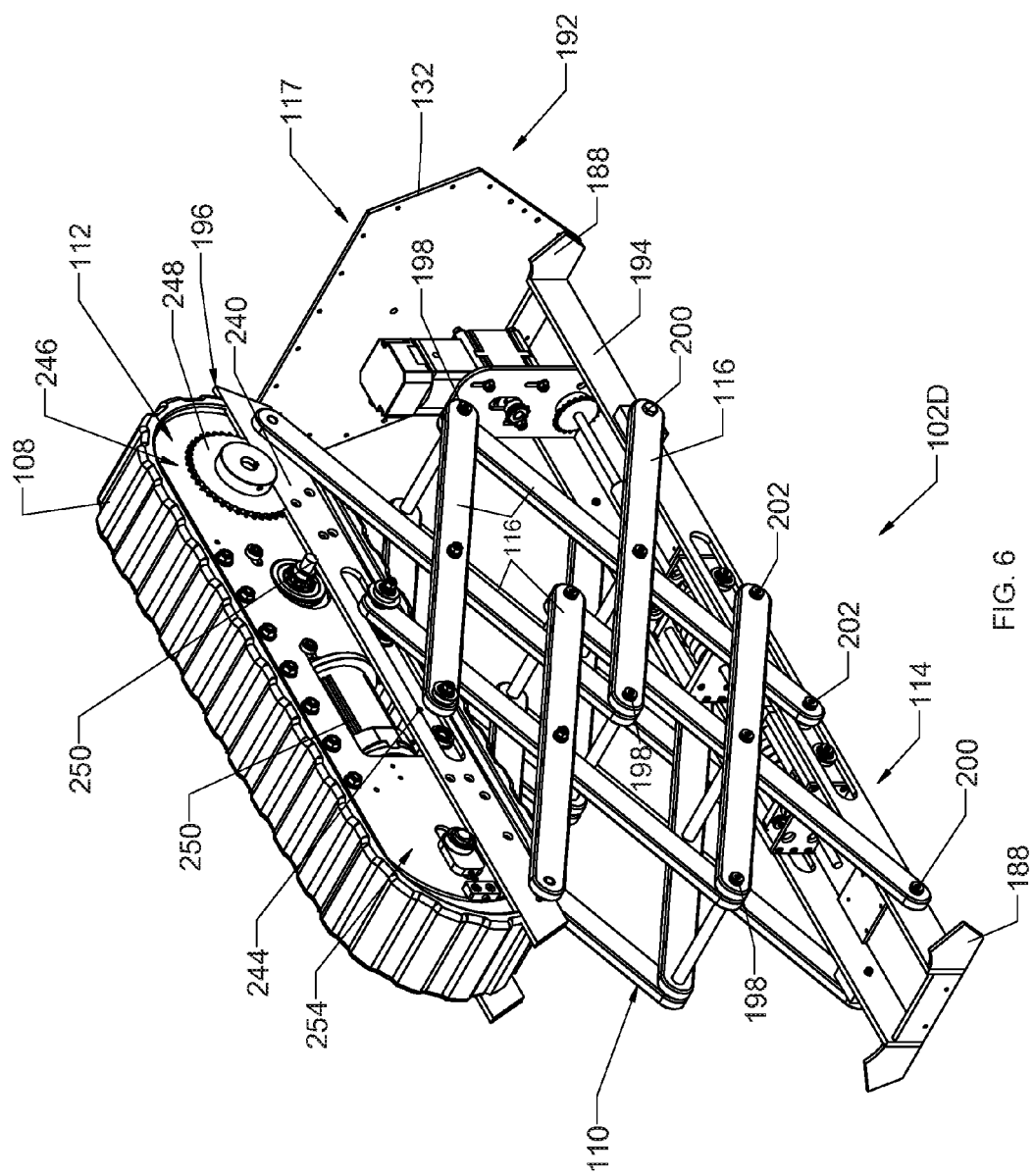
FIG. 6 depicts an isometric view of a drive pod assembly with the side wall members, the front wall member, and the drive assembly cover hidden from view.

Reference is now made to FIG. 6, which is a similar view to that of FIG. 5A, however, without the six side wall members 104 and without the drive assembly cover 180 shown. As seen in FIG. 6, the drive pod assembly 102D includes a pair of inner braces 188 that couple to the truncated hexagonal front and back wall members 120, 132. The inner braces 188 are coupled at opposite ends of the drive pod assembly 102D and include a spanning member (not shown) that links the pair of inner braces together 188.

Referring still to FIG. 6, the twin-scissor lift assembly 110 includes a pair of interlaced scissor lifts 114 that are actuated by an actuation assembly 192 at a base of the twin-scissor lift assembly 114. The interlaced scissors 114 include two scissor lifts that extend between a frame 194 of the actuation assembly 192 and a frame 196 for the drive assembly 112. Each scissor lift 114 includes folding support members 116 that fold about a hinge or joint 198. The interlaced scissor lifts 114 additionally include fixed outer ends 200 and translating inner ends 202. In particular, each scissor lift 114 includes a fixed outer end 200 and a translating inner end 202 on each respective side (e.g., frame 194 of actuation assembly 192, frame 196 of drive assembly 112) of the scissor lift 114. Because of the interlaced arrangement, each fixed outer end 200 is, however, not immediately adjacent its respective translating inner end 202. Rather, the fixed outer end 200 is immediately adjacent a translating inner end 202 from the other scissor lift 114. Similarly is the case for the other scissor lift 114. The translating inner ends 202 of the pair of scissor lifts 114 translate towards each other in expansion of the scissor lifts 114 and away from each other in contraction of the scissor lifts 114. Expansion of the scissor lifts 114 by translating the inner ends 202 towards each other is via the actuation assembly 192, which will be discussed below. Retraction of the drive assembly 112 is accomplished by either application of pressure to move apart the pair of ends 202 or, as in the case with a scissor lift 114 that opposes a load (e.g., weight of itself), retraction may be accomplished by the load moving the pair of ends 202 away from each other. In addition to the interlaced nature of the ends 202, the joints 198 of each respective scissor lift 114 are interlaced such that extension of the folding support members 116 beyond a certain point will result in an interlock between the members 116 that inhibits further extension. Stated differently, extension of the scissor lifts 114 is limited to the point that the joints 198 of each of the respective scissor lifts 114 interlock.

Figure 7:
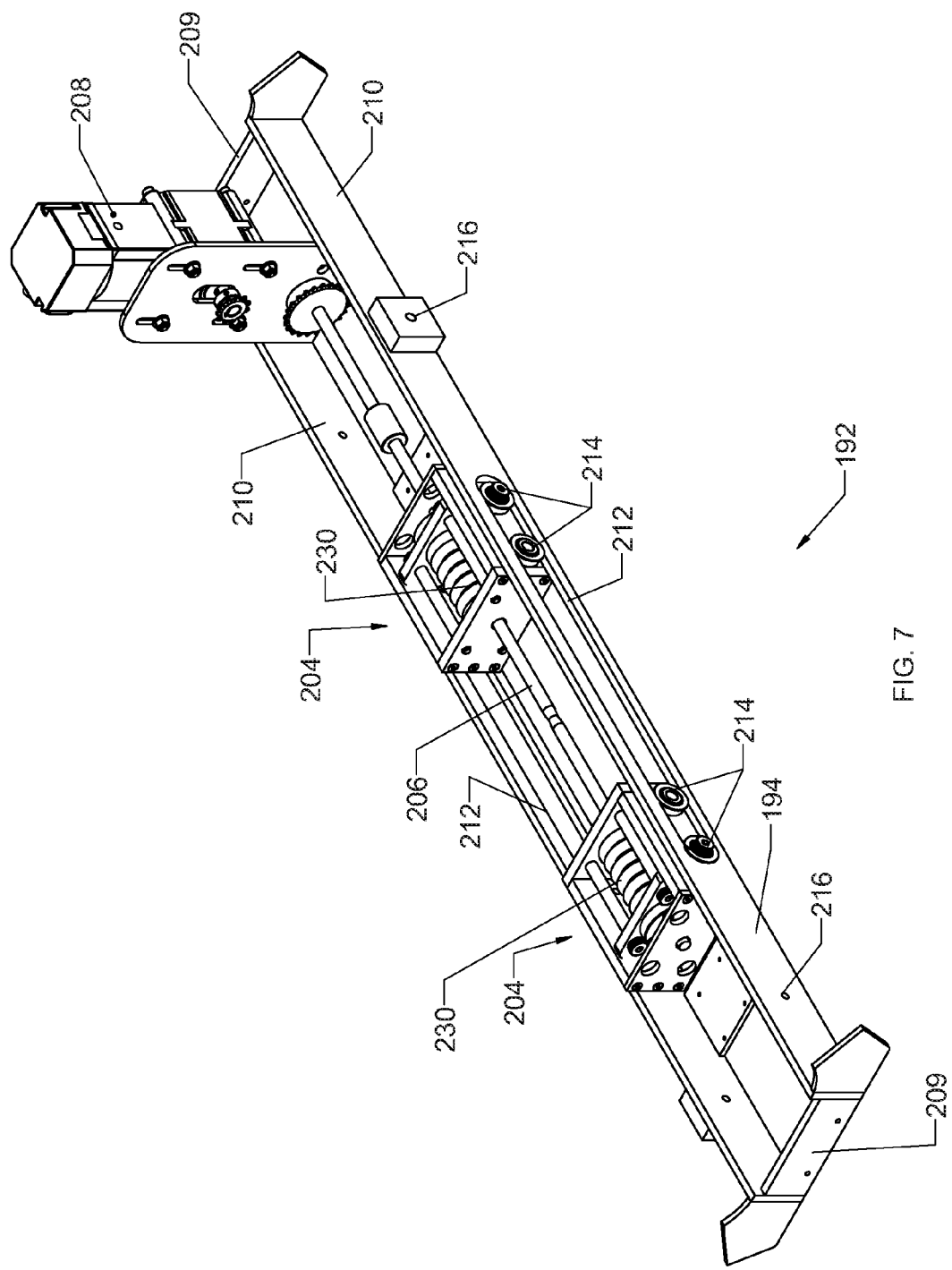
FIG. 7 depicts an isometric view of an actuation assembly for extending and retracting the dual scissor lifts.
Figure 8:
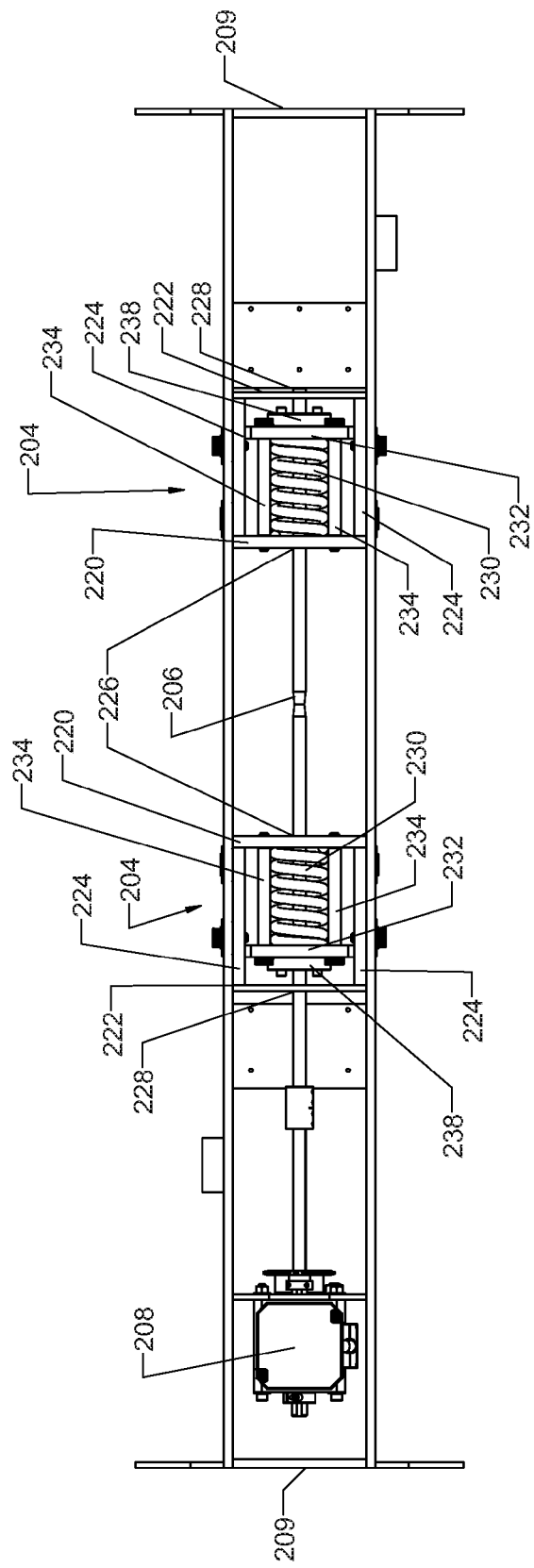
FIG. 8 depicts a top view of the actuation assembly of FIG. 7.

Reference is now made to FIGS. 7 and 8, which are, respectively, an isometric view and a top view of the actuation assembly 192. As mentioned previously, the actuation assembly 192 facilitates extension and retraction of the interlaced scissor lifts 114. The actuation assembly 192 includes the frame 194, a pair of trolleys 204 on a twin-lead screw 206, and a motor 208 that is affixed to the frame 194 and rotatably coupled with the twin-lead screw 206. The frame 194 is rectangular and includes a pair of end support members 209 that are sandwiched between a pair of side support members 210. The side support members 210 extend a length of the frame 194 and include trolley support openings or slots 212 that are coaxial with each other. The trolley support openings 212 support bearing members 214 that are coupled with the trolleys 204. The bearing members 214 that are centrally located are coupled to the inner translating ends 202 of the scissor lifts 114 (not shown in FIG. 7). The outer fixed ends 200 of the scissor lifts 114 are coupled to the frame 194 of the actuation assembly 192 at through holes 216 located at ends of the side support members 210.

The motor 208 drives the twin-lead screw 206, which is threadably coupled with the trolleys 204 such that as the motor 208 drives the twin-lead screw 206 in a first direction (e.g., clockwise), both trolleys 204 translate on the twin-lead screw 206 towards each other. As the motor 208 drives the twin-lead screw 206 a second direction (e.g., counterclockwise), both trolleys 204 translate on the twin-lead screw 206 away from each other. The trolleys 204 translate in this way because the twin-lead screw 206 includes opposing threads on either end of the screw 206 (i.e., each trolley 204 is coupled with an end). Accordingly, as the twin-lead screw 206 rotates in the first or second direction, the trolleys 204 translate in different directions because each are acted on by opposing threads.

Turning to FIG. 8, reference is directed to the trolleys 204 and twin-lead screw 206. As seen in the figure, the trolley 204 includes a housing defined by a front wall member 220, a back wall member 222, and a pair of side wall members 224. The twin-lead screw 206 extends through an opening 226 in the front wall member 220 and into an inner region defined on outer sides by the housing. The twin-lead screw 206 extends through the entire housing 218. The back wall member 222 includes an opening 228 for the twin-lead screw 206 to extend therethrough when the trolley 204 translates inward.

Referring back to the front of the trolley 204, the twin-lead screw 206 extends through a central opening of a compression spring 230 that compresses on one end against an internal side of the front wall member 220 and on a second end against an internal side of a floating plate 232. The floating plate 232 is parallel to the front and back wall member 220, 222 and is sized to translate within the housing 218 between the side wall members 224 while remaining parallel to the front and back wall members 220, 222. The floating plate 232 includes a pair of through holes for a pair of guide pins 234 to fit through. The guide pins 234 allow the floating plate 232 to float on the guide pins 234 and translate along a direction of the twin-lead screw 206 while maintaining a parallel orientation with the front and back wall members 220, 222. Thus, the guide pins 234 function to prevent the floating plate 232 from "kinking" or getting caught within the housing 218 of the trolley 204 when it translates in between the front and back wall members 220, 222. The guide pins 234 extend through the pair of through holes on the floating plate 232 and include a nut or similar feature that is larger than the through hole that will prevent the floating plate 232 from extending past. On the other end, the guide pins 234 are coupled with the front wall member 220. The floating plate 232 includes an additional opening for the twin-lead screw to extend therethrough. Here, the twin-lead screw 206 is rotatably coupled with a screw nut 238 or similar nut that engages with the threads on the twin-lead screw 206. The screw nut 238 is fixedly coupled to the floating plate 232 such that as the twin-lead screw 206 rotates the screw nut 238 does not rotate, but, rather, translates along the twin-lead screw 206. As the screw nut 238 begins to translate along the twin-lead screw 206, it transmits a force against the floating plate 232. This force is opposed by the compression spring 230, as well as a horizontal force associated with the scissor lift 114, which is coupled to the bearing member 214. Thus, the trolley 204 will translate inward along the twin-lead screw 206 when the force applied by the screw nut 238 against the floating plate 232 overcomes the combined force of the compression spring 230 and the horizontal force associated with the scissor lift 114, among other forces (e.g., friction).

As an example, if there is little to no force associated with the scissor lift 114 (or, if the spring constant is very high relative to the force associated with the scissor lift), the compression spring 230 may not compress a significant amount. Rather, the trolley 204 would translate along the twin-lead screw 206 with the compression spring 230 being uncompressed. Alternatively, if the scissor lift 114 accounts for a large horizontal force (or, if the spring constant is very low relative to the force associated with the scissor lift 114), the compression spring 230 may compress a significant amount before the combined forces of the scissor lift 114 and compression spring 230 are overcome in order for the trolley 204 to begin translating. In either case, the trolley 204 may include a load meter within the housing 218 of the trolley 204 that measures spring deflection and alerts an operator to the amount of force on each of the trolleys 204. The load meter can work in conjunction with the motor 208 to provide a feedback loop where a constant force is applied to the inner wall of the pipe.

It is noted that with this particular design of the twin-scissor lift assembly 110, the twin-lead screw 206 is always in tension because of the horizontal forces exerted by the load on the scissor lift 114 naturally exerts an outward force to the twin-lead screw 206. Because of the nature of high forces necessary to actuate scissor lifts 114, maintaining a tensile force on the twin-lead screw 206 enables the use of a smaller diameter screw than would otherwise be possible if the tension force were not present.

Referring now to the drive assembly 112, reference is made back to FIG. 6. As stated previously, the drive assembly 112 is linked with the twin-scissor lift assembly 110 by the coupling of the fixed outer ends 200 and translating inner ends 202 of the individual scissor lifts 114. More particularly, the fixed outer ends 200 and the translating inner ends 202 are coupled to a frame 196 of the drive assembly 112. The frame 196 includes a pair of side members 240 that extend a length of the frame 196 and a pair of angled end members (not shown) that extend between the side members 240 and span a width just wider than the tread 108. Each side member 240 includes a translating opening 244 that allows the translating inner ends 202 of the scissor lifts 114 to translate therein. The size of the translating openings 244 is similar to that of the trolley support openings 212 on the actuation assembly 192. Housed within the frame 196 is a drive hub 246 that is coupled with a drive sprocket 248 that is coupled via a chain or belt (not shown in FIG. 6) to a motor shaft 250 that is coupled to a motor 252. In this particular embodiment, the respective sprockets 248, 250 have a one to one ratio, but other ratios may be used. Opposite the drive hub 246 is an idler hub 254. And, as discussed previously, a continuous tread 108 is coupled over the drive hub 246 and the idler hub 254. As the drive hub 246 is driven by the motor 252, the drive hub 246 rotates and, in turn, rotates the continuous tread 108 and the idler hub 254. While the description of the drive pod assembly 102D includes a description of a continuous tread 108 on a drive hub 246 and idler hub 254, other mechanisms are possible to accomplish a similar function. For example, in place of the continuous tread 108, the drive assembly 112 could include a system of drive hubs with tread on each individual drive hub.

Turning back to FIGS. 1B and 10, the drive assembly 112 further includes a drive assembly cover 180 on both sides of the drive assembly 112. The drive assembly cover 180 shields the internal components of the drive assembly 112 from the pipe environment, which may be harmful to the motors, gears, etc. The cover 180 is stadium shaped and includes an inner stadium-shaped portion that accommodates the sprockets and belt or chain and an outer stadium-shaped portion that fits flush with the drive hub and idler hub.

Wires for communication and power associated with the motor and/or hoses for hydraulically or pneumatically driven gear motors may be routed down the twin-scissor lift assembly 110 and into the housing formed by the various wall members 104X, 104, 120, 132. At this point, the wires for the drive hub motor 252 may be combined with the wires for the motor 208 in the actuation assembly 192 and the combined wires may be routed out through an opening in one of the various wall members (e.g., back wall member 132). From here, the wires may be routed down the pipe and out through an opening (e.g., manhole) out of the pipe. Along the way through the pipe the wires from various other pod assemblies may join the combined wires.

III. Control Pod Assemblies

Figure 9:
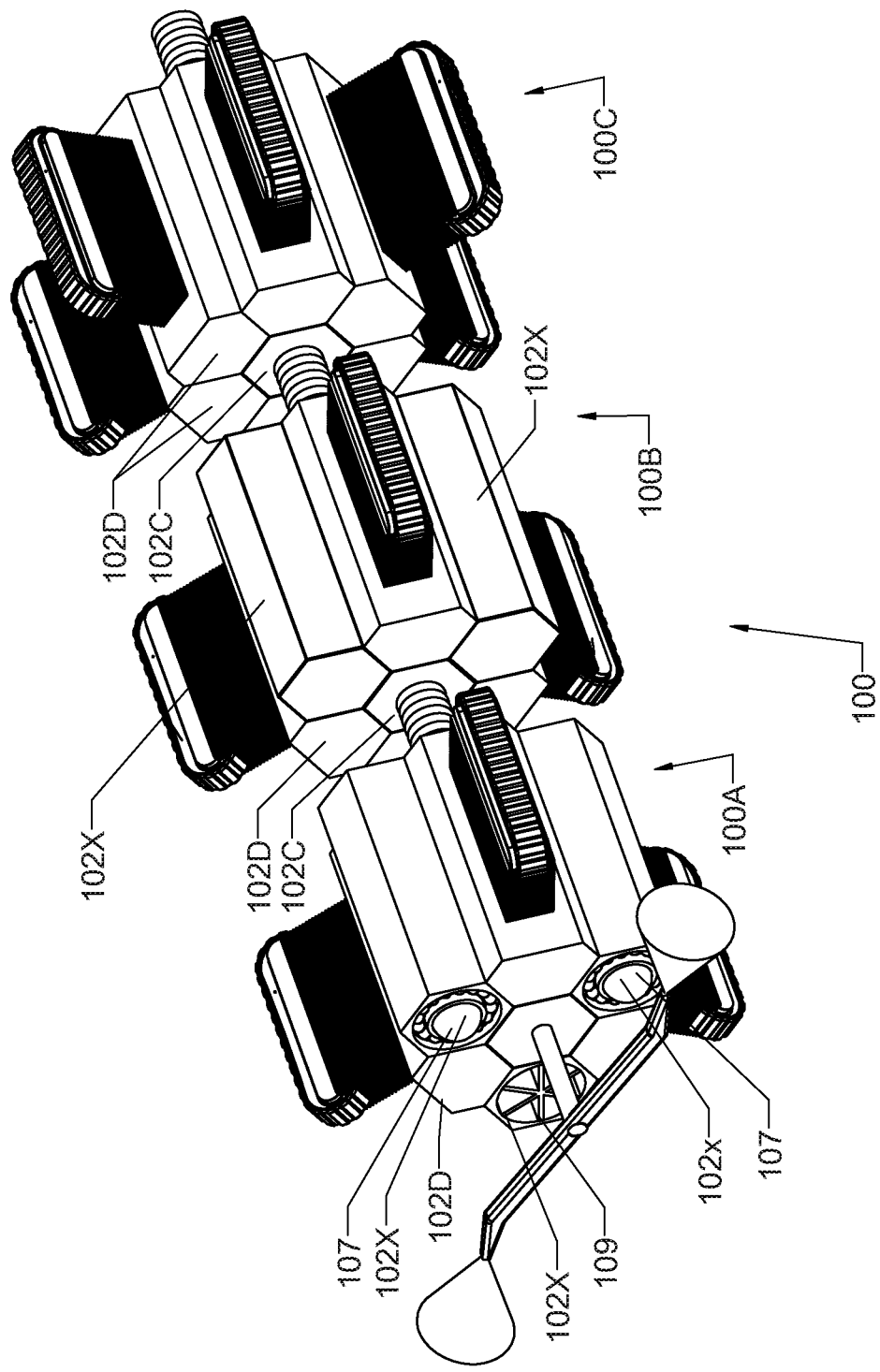
FIG. 9 depicts an isometric view of a modular robotic assembly including three clusters of individual pod assemblies, each cluster including specialized pod assemblies.

The discussion will now focus on FIG. 9, which is an isometric view of a modular robotic assembly 100 including three clusters 100A, 100B, 100C of individual pod assemblies 102. As seen in the figure, the first cluster 100A includes three drive pod assemblies 102D, a center pod assembly 102C, and three control pod assemblies 102X. Two control pod assemblies 102X include cameras and lighting 107 and one control pod assembly includes a blower 109. The second cluster 100B similarly includes three drive pod assemblies 102D, a center pod assembly 102C, and three control pod assemblies 102X. The center pod assembly 102C, however, acts as a conduit for the cords, cables, and hoses, among other elements, to pass through. The control pod assemblies 102X may house, for example, utilities and electronics and control systems. The third cluster 100C includes six drive pod assemblies 102D and a center pod assembly 102 that, similar to the second cluster 100B, acts as a conduit for various cables, hoses, and cords to pass through.

As seen in FIG. 9, the control pod assembly 102X may be the same shape as described with reference to the center pod assembly 102C in Section I. That is, the shape of the control pod 102X may be hexagonal and may include a length that matches the other pod assemblies 102. Control pod assemblies 102X may be positioned within the cluster that are convenient for the particular repair task that is at hand. For example, in the case of a repair task that requires high pressure water/abrasive spraying and/or epoxy spraying (as seen in the tool attachments in FIG. 9), it may be useful to include control pod assemblies 102X for lighting and cameras. For example, as seen in a first cluster 100A in FIG. 9, there are two control pod assemblies 102X dedicated to providing circulation of air via a blower 109 and one control pod assembly 102X dedicated to providing a video feed and lighting 107 to an operator working remotely. These control pod assemblies 102X are fitted within the cluster 100A in between each of the drive pod assemblies 102D. The particular cameras and lighting are standard and can include a number of brands and model numbers.

The second or middle cluster 100B includes three drive pod assemblies 102D and three control pod assemblies 102X that are dedicated to providing onboard electronics, controls, and utilities. These control pod assemblies 102X may be a hub for and include, for example, battery supplies for the various motors, lights, and cameras located in various clusters. In this arrangement, wires from the motors, camera, and lights that require control systems and control by an operator or robotic control can be routed to the control pod assemblies 102X that are dedicated to housing onboard electronics and controls while the wires from the motors, camera, and lights that require power may be routed to the control pod assemblies 102X that are dedicated to housing the utilities. These control pod assemblies 102X may also be a hub for and include, for example, the control systems for the various motors in each of the three clusters. Each of the motors may be wired out of their respective pod assemblies and into the control pod assemblies 102X and wired into their respective control system. From here, the collection of all wires may be routed from all of the control systems out of the control pod assembly 102X, down the pipe, and out of an opening in the pipe (e.g., manhole). Other types of electronics or control systems could be housed in the control pod assembly 102X as well. As stated previously, the third or tail-end cluster 100C includes six drive pod assemblies 102D.

The above mentioned control pod assemblies 102X are merely examples of suitable uses for additional assemblies within a cluster that will operate in a pipe environment. Other arrangements are possible and contemplated herein. For example, in a high pressure water/abrasive spraying context, a particular control pod assembly 102X may house water and/or an abrasive (e.g., sand) for immediate use or refilling purposes. The previous example is additionally applicable to epoxy or cementious coating operations. Additionally, a control pod 102X may include "booster" pumps to increase pressure that may be lost due to the modular robotic assembly 100 traveling a far distance from the initial pump, which may be above ground.

It is also noted that in a modular robotic assembly 100 with multiple clusters, a center pod assembly 102C that includes a cluster of pod assemblies 102 that follows a first cluster of assemblies may function as a modified control pod assembly 102X since it does not need to include the various assemblies of the center pod (e.g., shaft, tooling attachments), discussed above in Section I. Rather, the center-control pod 102C may be a shell of the center pod assembly and may simply function as, for example, a conduit for various wires and hoses for the various clusters.

IV. Tooling Attachments

Reference is now made back to FIGS. 2A and 2B, which are, respectively, isometric front views, and top views of a tooling attachment 122. As seen in the figures, the tooling attachment 122 includes a tooling hub that is configured to couple with the distal end 140 of the shaft 118 of the center pod assembly 102C. The tooling hub 122 is pivotally coupled with a pair of tooling arms 124 that extend from a front face of the tooling hub 122. The tooling arms 124 may include telescoping members 258 with passageways extending therethrough. The tooling arms 124 may also be pivoted towards each other or away from each other. At a distal end of the tooling arm is a spray head 126 that angles a nozzle 128 in one of a variety of directions. The angle of the nozzle 128 and the angle of the pivoting of the tooling arm 124 are all adjustable and may be remotely controlled by an operator. Alternatively, the angle of the nozzle 128 and the angle of the pivoting of the tooling arm 124 may be preset and locked in place for the duration of the repair task. A purpose of the pivoting of the tooling arm 124 is to position the spray head 126 an appropriate distance from the inner wall of the pipe. The appropriate distance will depend on the particular repair project. For example, high pressure water/abrasive spraying loses its effective ability to clean surfaces if the nozzle is too far away from the surface to be cleaned. And, if the nozzle is too close to the surface to be cleaned, the spray may be too strong and, thus, inefficiently perform the repair. Considering these variables, both the angle of the nozzle 128 and pivoting of the tooling arm 124 should be adjustable to accommodate for each particular repair task. As mentioned above, the tooling arms 124 are telescoping to provide a range of extension for the tooling arms.

Referring still to FIGS. 2A and 2B, pressurized hoses of water, abrasive, epoxy, etc. may be routed through the shaft 118 of the center pod assembly 102C, into the tooling hub 122. At this point, the hoses will be routed into and through the appropriate passageways of the tooling arms 124 and coupled to the nozzles 262 in the spray heads 260. In addition to pressurized hoses, controls for adjustment of the spray head 126 will be routed down the tooling arm 124, into the tooling hub 122, and back through the shaft 118 of the center pod assembly 102C. And, if the tooling hub 122 includes a motor to pivot the tooling arms 124, the power and control lines will also be routed down the shaft 118 of the control pod assembly 102X. It is noted that the tooling attachments 112 may be controlled electronically, pneumatically, or locked in place by an operator before the particular repair task is performed.

While a tooling attachment 122 with a pair of tooling arms 124 is described, the attachment can be modified in a number of ways to perform different repair projects. For example, the tooling attachment 122 may include a single tooling arm 124 and may include tooling arms 124 with pivoting joints. With such a pivoting joint, the tooling arm 124 could act as a "grabber" (in conjunction with another tooling arm or by itself) to grasp debris or other material in the pipe that must be removed. Other attachments, besides a spray head 126, can be coupled to the distal end of the tooling arm 124. For example, a drill, sander, welding tools, heaters, grinders, grippers, articulating tools, etc. can be coupled with the distal end of the tooling arm 124 to perform repair tasks. As another example, the tooling attachment 122 may include a first tooling arm 124 dedicated to drilling, for example, and a second tooling arm 124 dedicated to high pressure spraying or painting. As another example and referring back to FIG. 9, the tooling attachment 122 may include high pressure spraying functions and painting functions with a single tooling attachment and dedicated nozzles for each of spraying and painting.

V. Sizing and Materials

The discussion will now focus on the sizing of the various assemblies of the modular robotic assembly 100. Each individual pod assembly 102 is deployable through a 24 inch diameter round or square opening. For the center pod assembly 102C and the control pod assemblies 102X, the hexagonal dimensions may be as follows. The side length may be about 11 inches, the height may be about 19 inches, and the diagonal length may be about 22 inches. The drive pod assembly 102D may have similar dimensions. The length of all of the pod assemblies 102 may be about 54 inches long, although other lengths may be used. It must be considered that the length of the assemblies affects its ability to maneuver around corners and bends during deployment and operation. Referring specifically to the drive pod assembly 102D, the tread may be about 6 inches wide. While specific dimensions are referenced herein, it is noted that the design of the pod assemblies 102 is scalable and may, for example, be scaled down such that the hexagonal profile or diagonal length may be about 6 inches.

The operational distance for the modular robotic assembly 100 may be about 2,000 feet or longer based on the particular arrangement of clusters of individual pod assemblies 102 and the particular repair task.

The modular robotic assembly 100 is operation within pipe diameters ranging from 32 inches in diameter to about 240 inches in diameter. When operating within a pipe, the modular robotic assembly 100 is configured to travel at rates between about 0 and about 100 feet per minute. And, depending on the speed of travel, the modular robotic assembly 100 may apply coatings (e.g., epoxy, polyuria) at rates in a range of about 0 to about 15 gallons per minute.

Regarding the materials of the modular robotic assembly 100, the various side walls and front and back members may be made from a plated or sheet steel or aluminum of about 14 gauge to about 3/8 inch thick. The steel may be corrosion resistant or include a coating on the steel to inhibit rust. The shaft 118 of the center pod assembly 102C may include a diameter of about 4 inches. The twin-scissor lift assembly 114 may expand a distance 48 inches from its initial, fully retracted position.

VI. Operation

Now the discussion will focus on a few of the different arrangements of possible configurations. As mentioned above, the modular robotic assembly 100 may be configured in multiple clusters of individual pod assemblies 102 to fit a particular pipe geometry and to work as a functional unit to perform a repair task within a pipe. As seen in FIG. 10, the modular robotic assembly 100 may be configured with a single center pod 102C and six pod assemblies 102 surrounding the center pod. In this particular embodiment, four of the pod assemblies 102 are drive pod assemblies 102D. Such an embodiment may be useful in a vertical pipe, among other pipes, where maximum power transmission from the drive pod assemblies 102D is needed.

Referring to FIG. 11, the modular robotic assembly 100 includes a single center pod assembly 102C and three drive pod assemblies 102D that are evenly spaced around the center pod assembly 102C. FIG. 12 depicts a modular robotic assembly 100 that includes a single center pod assembly 102C and two drive pod assemblies 102D positioned downward and parallel to each other. This configuration may be useful, for example, for using the assembly 100 on a flat surface with no other surfaces immediately adjacent the flat surface or the assembly 100. FIG. 13 depicts a modular robotic assembly 100 with two drive pod assemblies 102D adjacent each other and angling away from each other. This configuration may be useful, for example, in a curvilinear triangular pipe or a smaller diameter circular pipe, among others.

Other embodiments of clusters of pod assemblies 102 are possible based on the modularity of the individual assemblies and, as such, all possibilities will not be discussed herein. For example, in a relatively small diameter pipe, the modular robotic assembly 100 may include a single drive pod assembly 102D that is positioned proximal and generally coaxially aligned with a center pod assembly 102C. In this way, the pods 102C, 102D are in-line with each other in the pipe and the pods 102C, 102D otherwise function as described herein.

Figure 14:
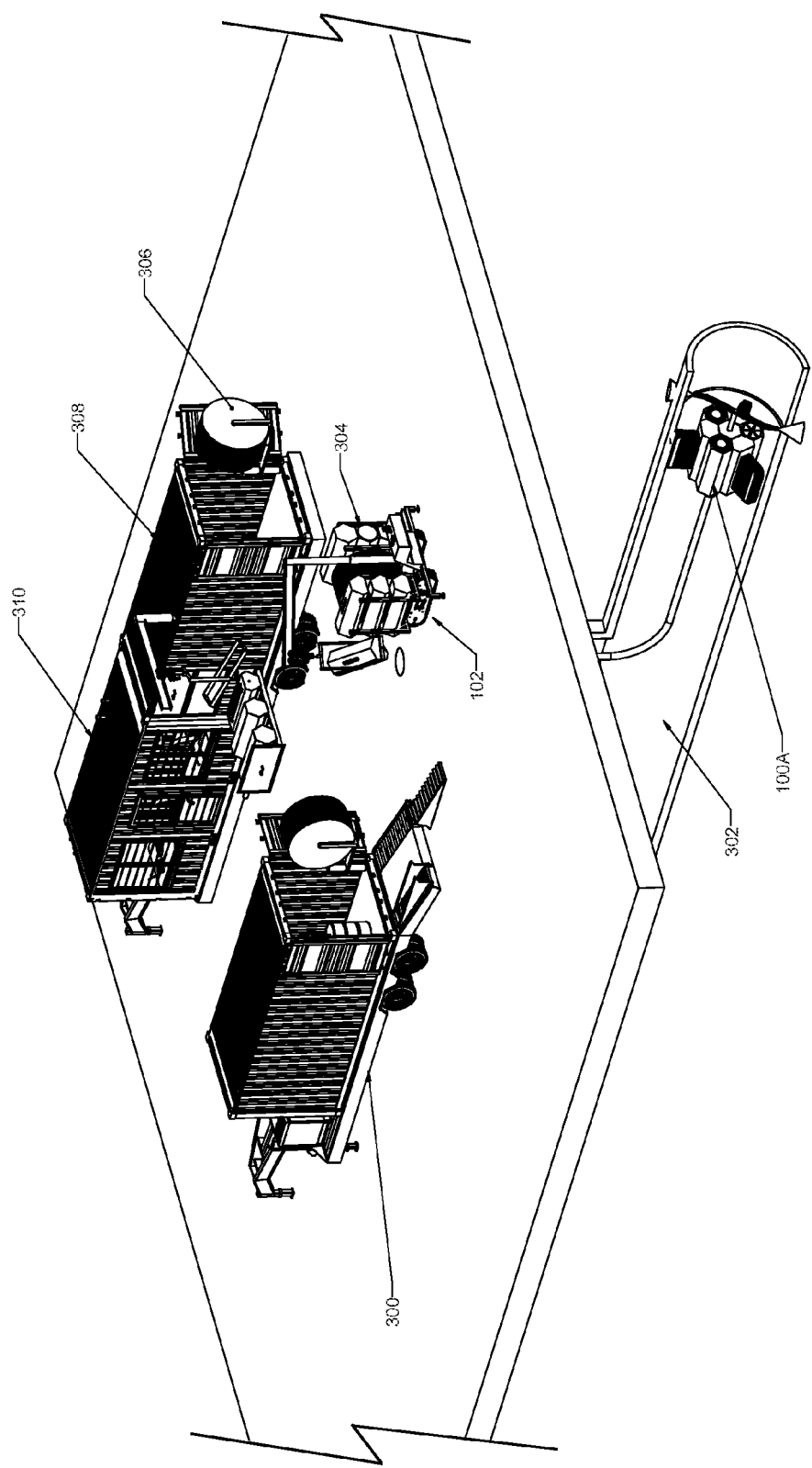
FIG. 14 depicts an isometric view of a modular robotic assembly operating in a pipe with various associated equipment positioned above ground.

Reference is now made to FIG. 14, which is an isometric view of a modular robotic assembly 100 that includes a single cluster 100A of individual pod assemblies 102 operating within a circular pipe 302 while additional pod assemblies 102 are being positioned to be deployed within the pipe 302. Outside the pipe 302 may include a materials trailer 300, a deployment crawler 304, a hose reel 306, a robot trailer 308, and an operator station 310. As seen in FIG. 14, the modular robotic assembly 100 is positioned within a large diameter pipe 302 and the cluster assembled within the pipe 302, unless the pipe opening is sufficiently large enough for the entire cluster to pass therethrough. Once in the pipe and fully assembled, the drive pod assemblies 102D must initially extend the scissor lifts 114 until the treads 108 contact the inner wall of the pipe 302. The actuation assembly 192 of the drive pod assembly 102D may be configured to automatically extend until a certain pressure (e.g., 200 lbs.) on the treads is registered by the load meter in the actuation assembly 192. In this case, the motor 208 in the actuation assembly 192 will operate within a feedback loop where the motor 208 causes the scissor lift 114 to extend until the pressure value is reached. Once the pressure value is reached, the motor 208 will cease increasing the extension of the scissor lift 114. If additional force is detected by the load meter (e.g., constriction in the pipe), the motor 208 may reverse direction or simply allow the force to naturally retract the scissor lift 114 until the pressure value again reaches the desired amount. In this way, the twin-scissor lift assembly 110 is automatically adaptable to certain changes within the pipe's geometry.

Once the twin-scissor lift assemblies 110 are oriented within the particular pipe's geometry, the modular robotic assembly 100 may travel to its end destination within the pipe 302. Referring back to FIG. 9, while the clusters of pod assemblies 102 are depicted as being close to each other, the pod assemblies 102 may be spaced relatively far apart while in operation. And, since the first cluster 100A includes the center pod 102C with the tool attachment, its speed of operation may be set based on its particular repair task. For example, once the first cluster 100A of pod assemblies 102 is at its end destination, it may begin its repair task (e.g., high pressure water/abrasive spraying) and begin traveling backwards towards the opening of the pipe 302. The second and third cluster 100B, 100C may move in concert with first cluster 100A as it performs its repair task. Alternatively, if there is a large gap between the first and the second cluster 100A, 100B, the second and the third cluster 100B, 100C may remain stationary for a period of time. As another alternative, the second and the third cluster 100B, 100C may operate as shuttles to shuttle repair products (e.g., epoxy replacements) to the first cluster of pod assemblies 102. In this alternative, the first cluster 100A may travel slowly while performing its repair task while the second and third clusters 100B, 100C move quickly from the first cluster 100A to the opening in the pipe 302 to where an operator can refill repair products into the clusters. Then, the second and third clusters 100B, 100C may shuttle the repair product to the first cluster 100A to refill spent tanks, for example. Common refilling procedures on-the-go can be utilized in this type of operation.

Considering the modularity of the clusters of pod assemblies 102, there are many possibilities of cluster arrangements and methods for performing pipe repair tasks. The disclosure herein is not meant to be limiting but merely examples of the variety of possibilities.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., distal, proximal, front, back, side, top, bottom) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A modular robotic assembly for repairing a conduit comprising:
    a first pod assembly comprising a first frame assembly extending a first length along a first longitudinal axis, a displacement assembly housed at least partially within the first frame assembly, and a shaft rotatably supported by the displacement assembly at a first end region of the shaft, the shaft extending out of the first frame assembly and coupled with a tooling attachment at a second end region of the shaft, the displacement assembly configured to cause the shaft to translate or rotate relative to the first frame assembly; and
    a second pod assembly operably coupled with the first pod assembly such that the first and second pod assemblies are configured to operate as a functional unit to perform a task within the conduit, the second pod assembly comprising a second frame assembly extending a second length along a second longitudinal axis, and a drive mechanism configured to provide movement for the functional unit,
    wherein the first and second pod assemblies couple with each other such that the first and second longitudinal axes are coaxially aligned.

2. The modular robotic assembly of claim 1, wherein the first frame assembly defines a hexagonal cross section extending along the first longitudinal axis.

3. The modular robotic assembly of claim 1, wherein the tooling attachment comprises a tooling arm coupled to a spray head configured to direct a flow of repair material being sprayed from the spray head to a surface of the conduit.

4. The modular robotic assembly of claim 3, wherein a passageway extends through the tooling arm and the shaft for the flow of repair material.

5. The modular robotic assembly of claim 3, wherein the tooling arm adjustable via a series of telescoping members.

6. The modular robotic assembly of claim 1, further comprising a third pod assembly operably coupled with the first and second pod assemblies such that the first, second, and third pod assemblies operate as the functional unit to perform the task within the conduit, the third pod assembly defining a third longitudinal axis, a third frame extending a third length along the third longitudinal axis and supporting a third housing, and a camera configured to provide remote visualization of a portion of the conduit.

7. The modular robotic assembly of claim 1, wherein the shaft translates along an axis parallel to the first longitudinal axis.

8. The modular robotic assembly of claim 1, wherein the drive mechanism is configured to provide movement for the functional unit in a direction parallel to the second longitudinal axis.

9. A modular robotic assembly for repairing a conduit comprising:
    a first pod assembly comprising a first frame assembly extending a first length along a first longitudinal axis, a displacement assembly housed at least partially within the first frame assembly, and a shaft rotatably supported by the displacement assembly at a first end region of the shaft, the shaft extending out of the first frame assembly and coupled with a tooling attachment at a second end region of the shaft, the displacement assembly configured to cause the shaft to translate or rotate relative to the first frame assembly; and
    a second pod assembly operably coupled with the first pod assembly such that the first and second pod assemblies are configured to operate as a functional unit to perform a task within the conduit, the second pod assembly comprising a second frame assembly extending a second length along a second longitudinal axis, and a drive mechanism configured to provide movement for the functional unit,
    wherein the first and second pod assemblies each comprise six side surfaces that extend the respective first and second lengths, and the first and second pod assemblies are coupled together such that a respective side surface from each of the first and second pod assemblies opposes each other.

10. The modular robotic assembly of claim 9, wherein the first frame assembly defines a hexagonal cross section extending along the first longitudinal axis.

11. The modular robotic assembly of claim 9, further comprising a third pod assembly operably coupled with the first and second pod assemblies such that the first, second, and third pod assemblies operate as the functional unit to perform the task within the conduit, the third pod assembly extending a third length along a third longitudinal axis and comprising a third drive mechanism configured to provide movement for the functional unit.

12. The modular robotic assembly of claim 11, wherein the third drive mechanism is configured to provide movement for the functional unit in a direction parallel to the third longitudinal axis.

13. A modular robotic assembly for repairing a conduit comprising:
    a first pod assembly comprising a first frame assembly extending a first length along a first longitudinal axis, a displacement assembly housed at least partially within the first frame assembly, and a shaft rotatably supported by the displacement assembly at a first end region of the shaft, the shaft extending out of the first frame assembly and coupled with a tooling attachment at a second end region of the shaft, the displacement assembly configured to cause the shaft to translate or rotate relative to the first frame assembly; and
    a second pod assembly operably coupled with the first pod assembly such that the first and second pod assemblies are configured to operate as a functional unit to perform a task within the conduit, the second pod assembly comprising a second frame assembly extending a second length along a second longitudinal axis, and a drive mechanism configured to provide movement for the functional unit,
    wherein the second pod assembly further comprises a scissor lift supported by the second frame assembly and supporting the drive mechanism, the scissor lift comprising a plurality of folding support members that are linked in a crisscrossed pattern, the drive mechanism configured to be at least partially housed within the second frame assembly when the plurality of folding support members are in a retracted position and configured to be completely outside of the second frame assembly when the plurality of folding support members are in an expanded position.

14. The modular robotic assembly of claim 13, wherein the drive mechanism comprises a drive motor positioned between a pair of gears supporting a continuous tread, the drive motor coupled with at least one of the pair of gears to drive the at least one of the pair of gears.

15. The modular robotic assembly of claim 13, wherein the scissor lift is a twin-scissor lift comprising a first scissor lift comprising a first plurality of folding support members that fold about a first joint and a second scissor lift comprising a second plurality of folding support members that fold about a second joint, wherein the first and second plurality of folding support members are interlaced about the first and second joints.

16. The modular robotic assembly of claim 15, wherein the first and second plurality of folding support members are supported within the second frame assembly by a frame of an actuation assembly, the first plurality of folding support members are supported by the frame at first fixed outer ends and first translating inner ends, the second plurality of folding support members are supported by the frame at second fixed outer ends and second translating inner ends, wherein actuation of a twin-lead screw translates the first and second translating inner ends within a slot in the frame.

17. The modular robotic assembly of claim 16, wherein the second translating inner ends are positioned between the first fixed outer ends and the first translating inner ends.

18. A modular robotic assembly for repairing a conduit comprising:
  a first pod assembly comprising a first frame assembly extending a first length along a first longitudinal axis, a displacement assembly housed at least partially within the first frame assembly, and a shaft rotatably supported by the displacement assembly at a first end region of the shaft, the shaft extending out of the first frame assembly and coupled with a tooling attachment at a second end region of the shaft, the displacement assembly configured to cause the shaft to translate or rotate relative to the first frame assembly;
  a second pod assembly operably coupled with the first pod assembly such that the first and second pod assemblies are configured to operate as a functional unit to perform a task within the conduit, the second pod assembly comprising a second frame assembly extending a second length along a second longitudinal axis, and a drive mechanism configured to provide movement for the functional unit; and
  a first plurality of the first pod assembly comprising a first and a second pod and a second plurality of the second pod assembly comprising a third and a fourth pod, wherein a first cluster is formed by operably coupling the first pod and the third pod along opposing sides, a second cluster is formed by operably coupling the second pod and the fourth pod along opposing sides, wherein the first and the second cluster translate within the conduit along a common axis.

19. The modular robotic assembly of claim 18, wherein the first and second pods define a hexagonal cross section, wherein the third and fourth pods define a truncated hexagonal cross section.

20. The modular robotic assembly of claim 19, wherein the first and third pods couple with each other such that respective sides defined by the hexagonal cross section and the truncated hexagonal cross section oppose each other, wherein the second and fourth pods couple with each other such that respective sides defined by the hexagonal cross section and the truncated hexagonal cross section oppose each other.

21. A modular robotic assembly for repairing a conduit comprising:
  a first pod assembly comprising a first frame assembly extending a first length along a first longitudinal axis, a displacement assembly housed at least partially within the first frame assembly, and a shaft rotatably supported by the displacement assembly at a first end region of the shaft, the shaft extending out of the first frame assembly and coupled with a tooling attachment at a second end region of the shaft, the displacement assembly configured to cause the shaft to translate or rotate relative to the first frame assembly;
  a second pod assembly operably coupled with the first pod assembly such that the first and second pod assemblies are configured to operate as a functional unit to perform a task within the conduit, the second pod assembly comprising a second frame assembly extending a second length along a second longitudinal axis, and a drive mechanism configured to provide movement for the functional unit; and
  a third pod assembly operably coupled with the first and second pod assemblies such that the first, second, and third pod assemblies operate as the functional unit to perform the task within the conduit, the third pod assembly defining a third longitudinal axis, a third frame extending a third length along the third longitudinal axis and supporting a third housing, and a reservoir for repair product within the third housing, the reservoir comprising a releasable connection such that the repair product may be conveyed to the tooling attachment at the second end region of the shaft.

22. A modular robotic assembly for repairing a conduit comprising:
  a first pod assembly comprising a first frame assembly extending a first length along a first longitudinal axis, a displacement assembly housed at least partially within the first frame assembly, and a shaft rotatably supported by the displacement assembly at a first end region of the shaft, the shaft extending out of the first frame assembly and coupled with a tooling attachment at a second end region of the shaft, the displacement assembly configured to cause the shaft to translate or rotate relative to the first frame assembly;
  a second pod assembly operably coupled with the first pod assembly such that the first and second pod assemblies are configured to operate as a functional unit to perform a task within the conduit, the second pod assembly comprising a second frame assembly extending a second length along a second longitudinal axis, and a drive mechanism configured to provide movement for the functional unit; and
  a third pod assembly operably coupled with the first and second pod assemblies such that the first, second, and third pod assemblies operate as the functional unit to perform the task within the conduit, the third pod assembly defining a third longitudinal axis, a third frame extending a third length along the third longitudinal axis and supporting a third housing, and a utilities hub within the third housing configured for routing electrical power to any of the first, second, or third pod assemblies.

* * * * *